(12) United States Patent
Adachi

(10) Patent No.: US 11,340,501 B2
(45) Date of Patent: May 24, 2022

(54) DISPLAY DEVICE

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/902,819

(22) Filed: Jun. 16, 2020

(65) Prior Publication Data
US 2020/0400981 A1 Dec. 24, 2020

(30) Foreign Application Priority Data

Jun. 20, 2019 (JP) .............................. JP2019-114315

(51) Int. Cl.
*G02F 1/1339* (2006.01)

(52) U.S. Cl.
CPC ........ *G02F 1/1339* (2013.01); *G02F 1/13396* (2021.01)

(58) Field of Classification Search
CPC ............................ G02F 1/13336; G02F 1/1339
See application file for complete search history.

(56) References Cited

U.S. PATENT DOCUMENTS

| | | | |
|---|---|---|---|
| 6,181,405 B1* | 1/2001 | Izumi | G02F 1/13336 349/73 |
| 7,834,550 B2* | 11/2010 | Lee | H01L 51/5246 313/512 |
| 9,443,781 B2* | 9/2016 | Asai | G09G 3/36 |
| 2010/0045921 A1* | 2/2010 | Wang | G02F 1/133351 349/153 |
| 2012/0194773 A1* | 8/2012 | Kim | G09G 3/3674 349/139 |
| 2016/0070127 A1 | 3/2016 | Ishikawa | |

FOREIGN PATENT DOCUMENTS

JP 2016057487 A 4/2016

\* cited by examiner

*Primary Examiner* — Dung T Nguyen
(74) *Attorney, Agent, or Firm* — K&L Gates LLP

(57) ABSTRACT

According to one embodiment, a display device includes a first substrate, a second substrate, a first sealant surrounding a first chamber and a second chamber between the first substrate and the second substrate, a second sealant disposed between the first chamber and the second chamber, and a liquid crystal layer with which the first chamber and the second chamber are filled. The first chamber includes a first display portion including a first pixel. The second chamber includes a second display portion including a second pixel. The first sealant includes a first wall having a predetermined width and a second wall having a width less than the width of the first wall.

12 Claims, 23 Drawing Sheets

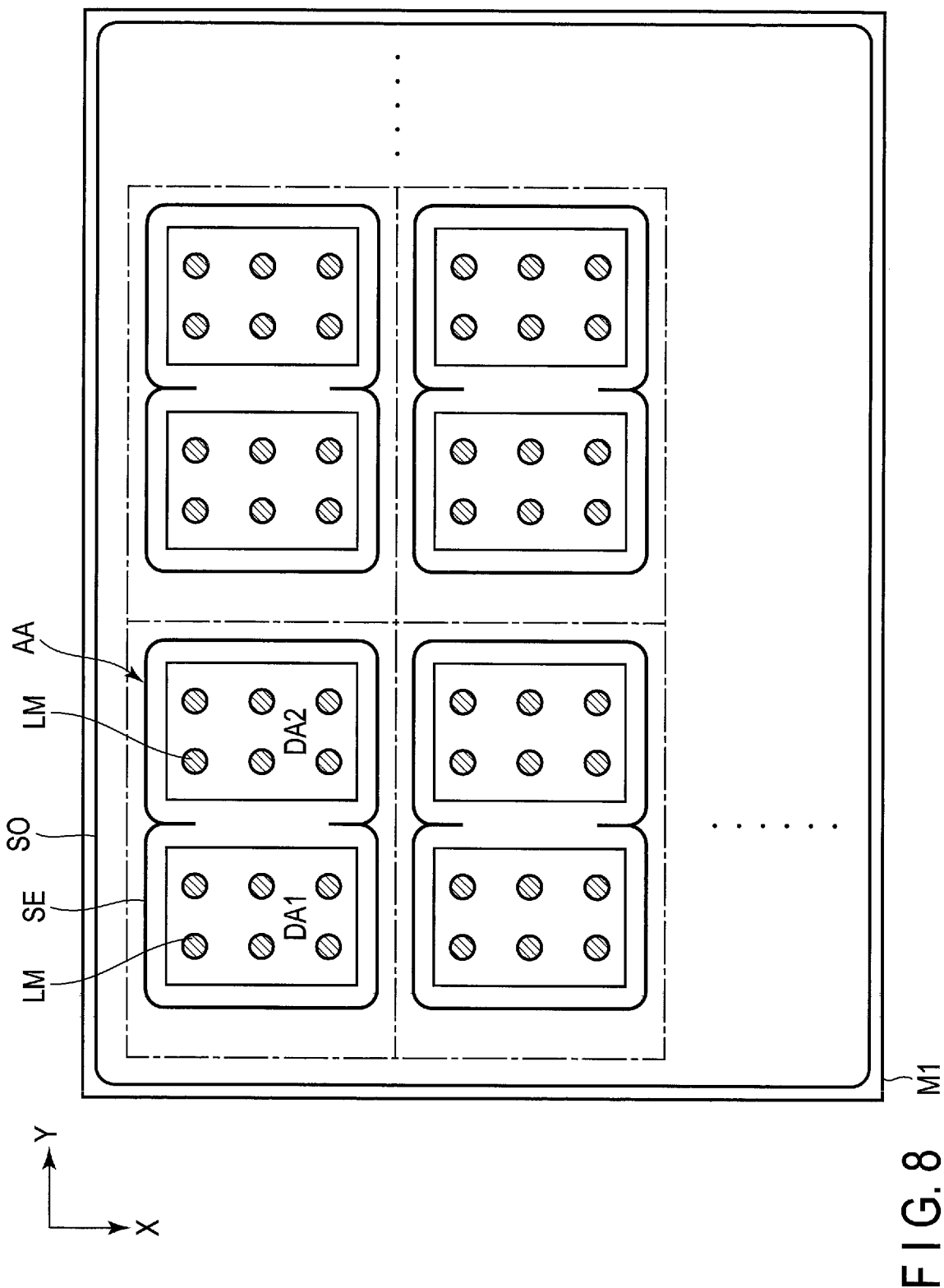
F I G. 8

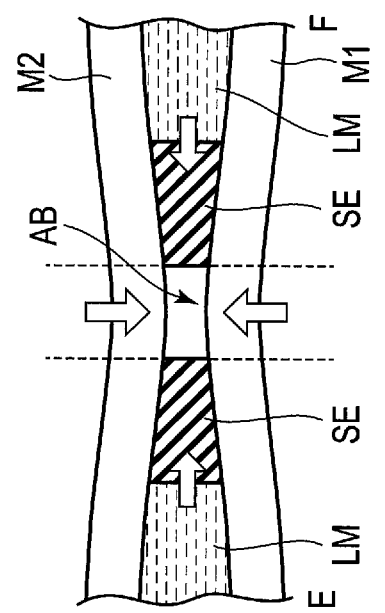
F I G. 10B
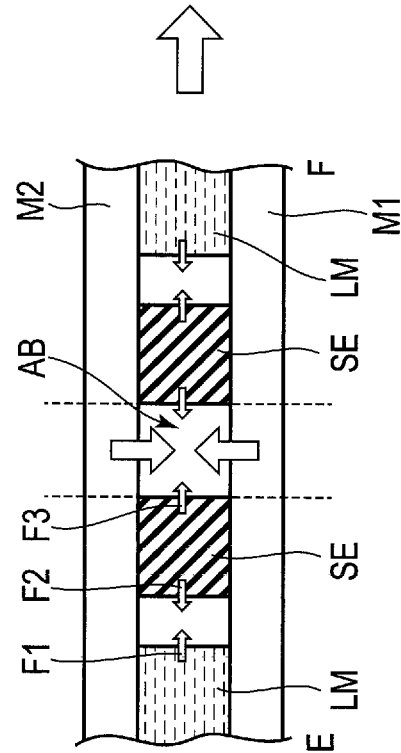
F I G. 10A

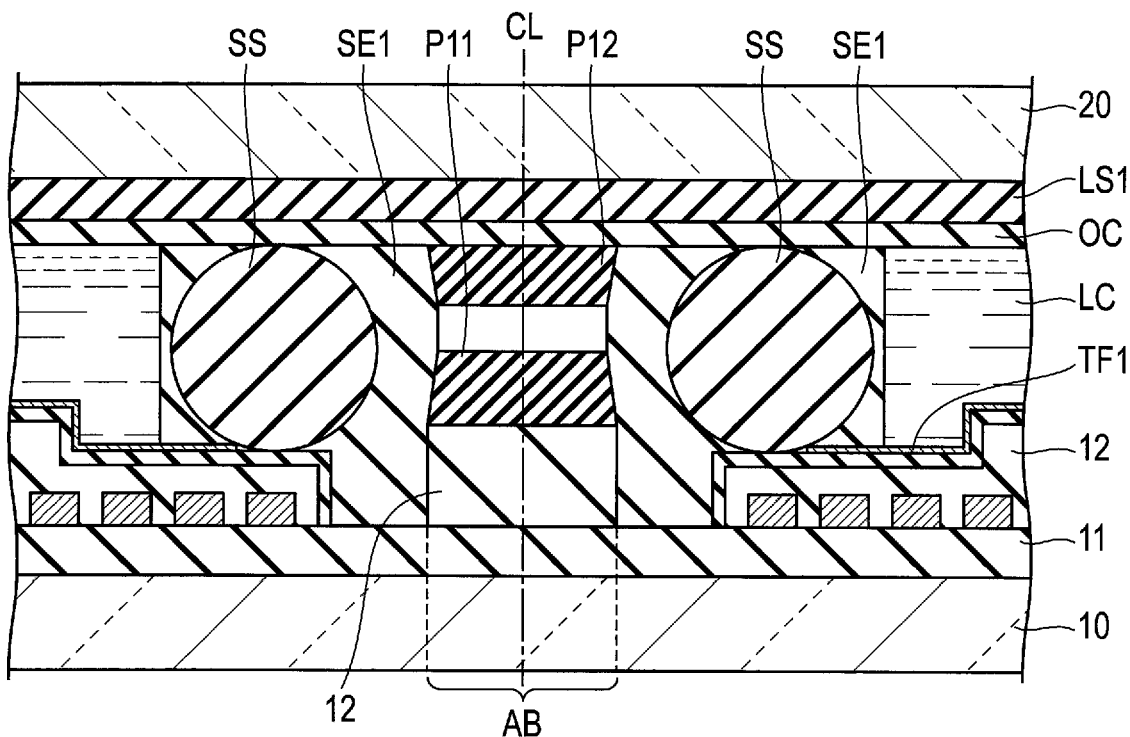
F I G. 18A
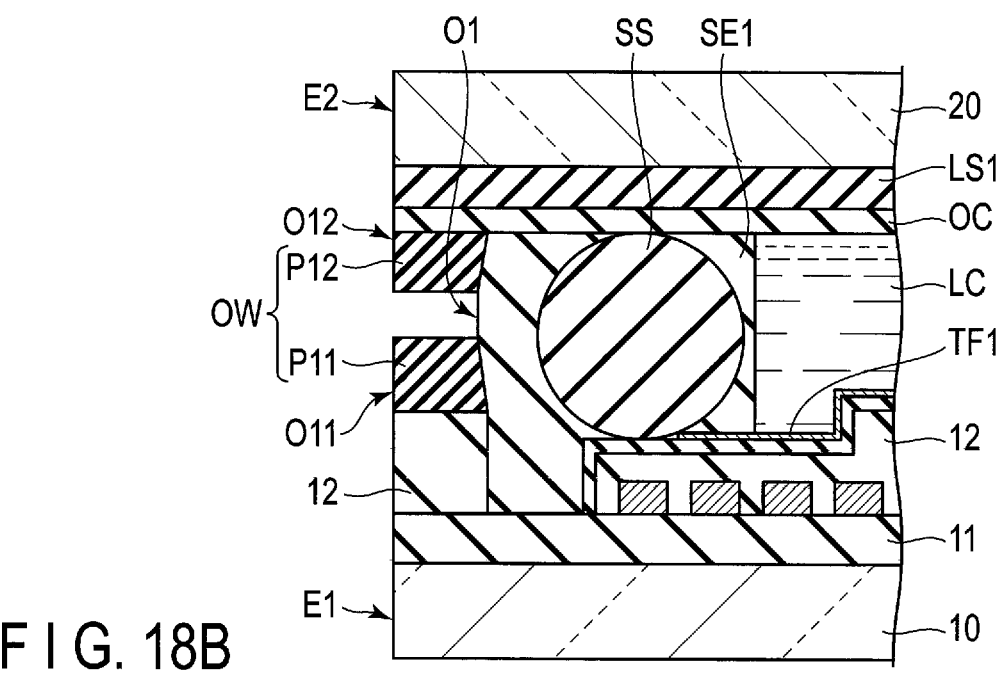
F I G. 18B

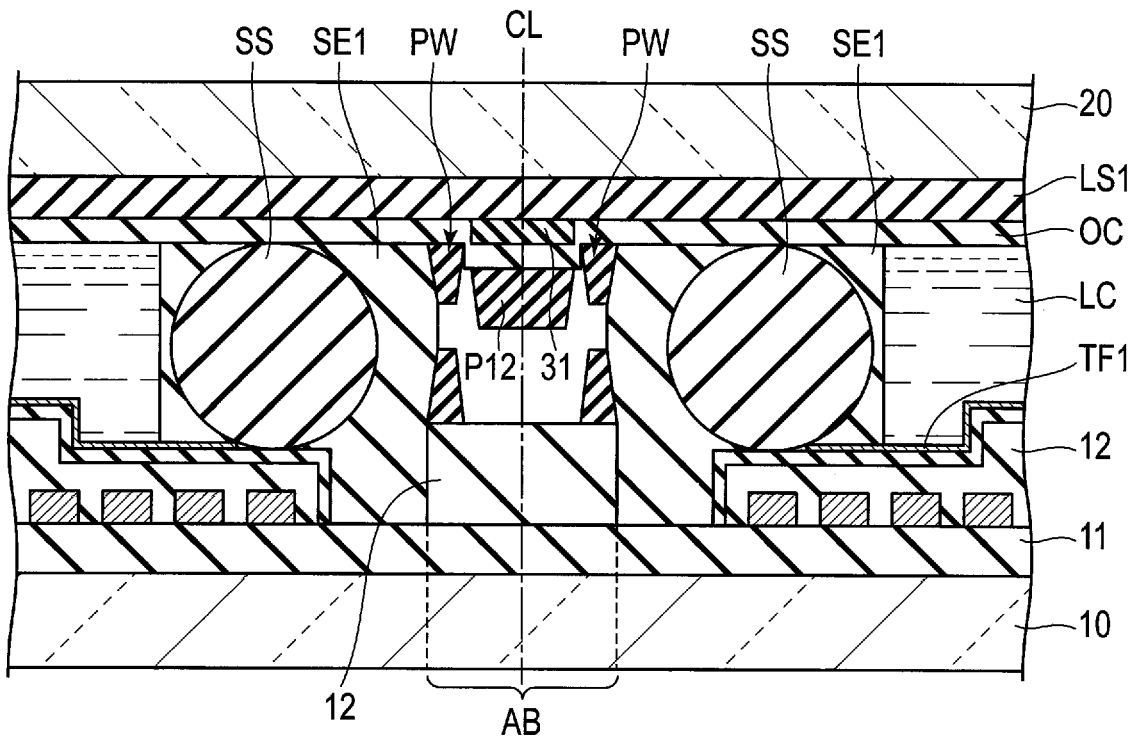
F I G. 20A
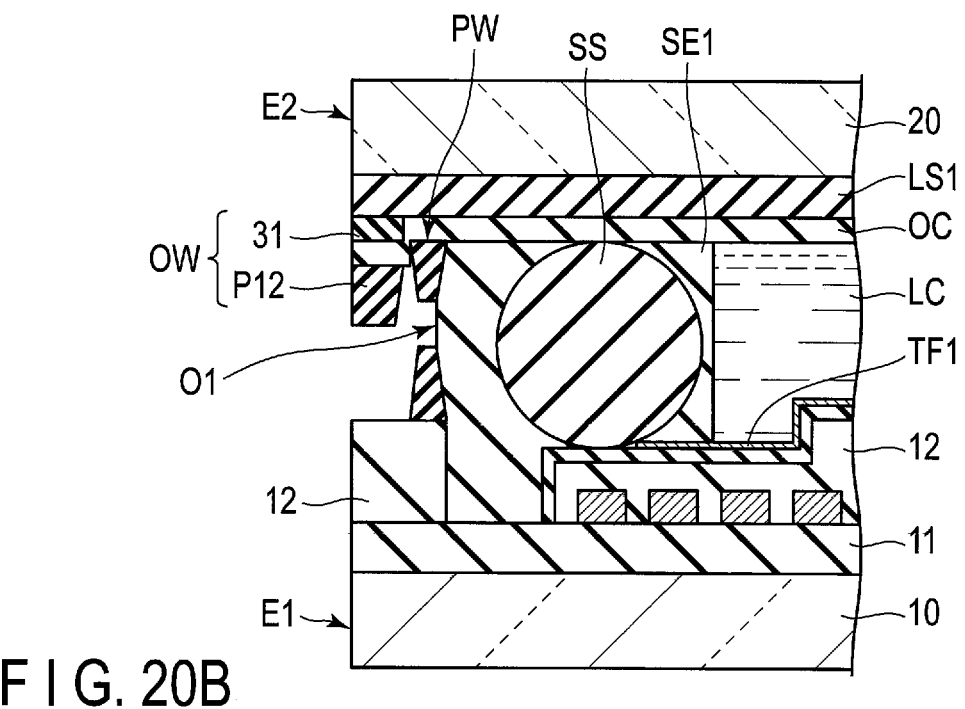
F I G. 20B

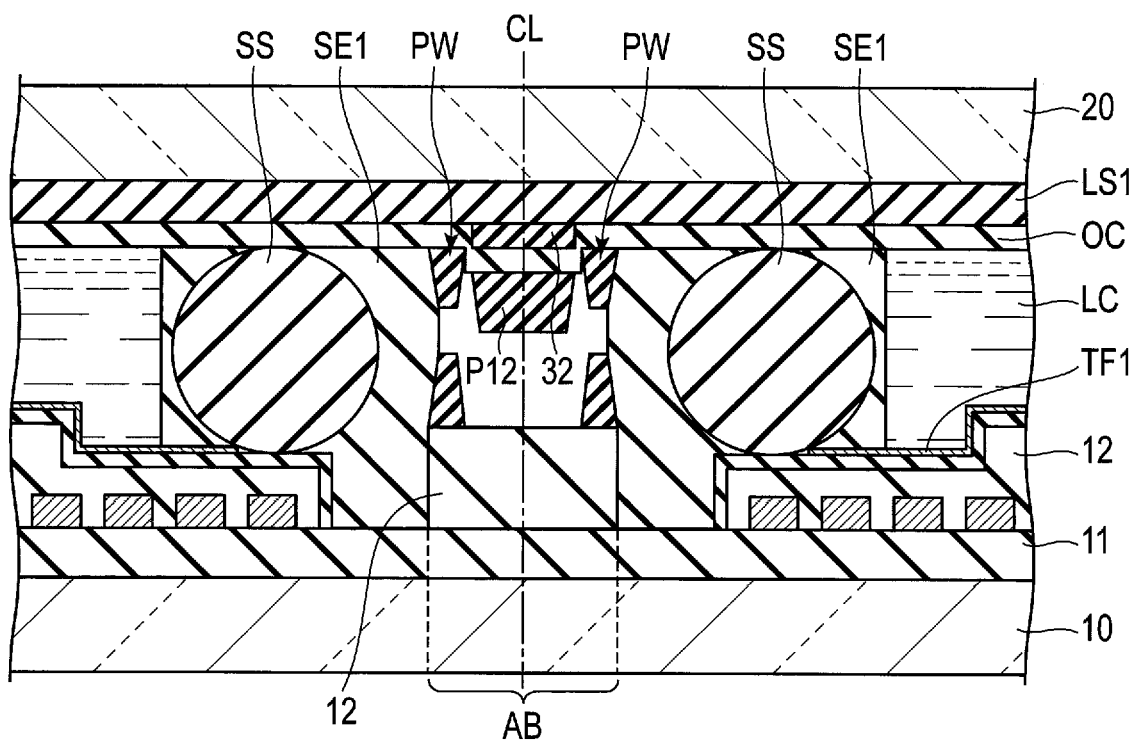
F I G. 21A
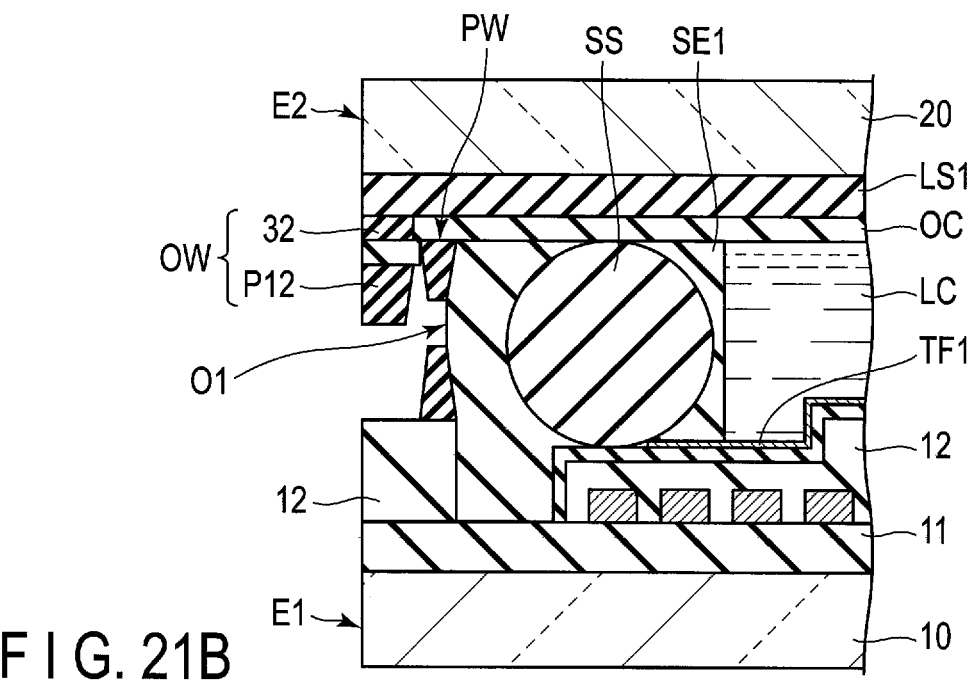
F I G. 21B

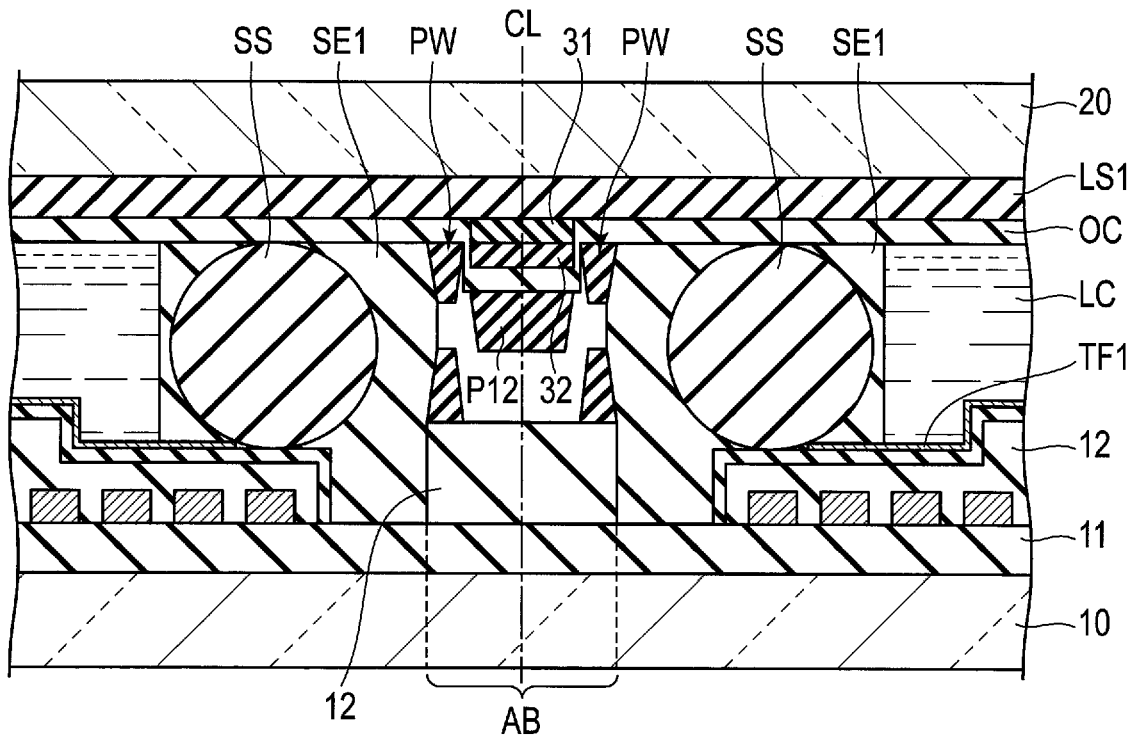
F I G. 22A
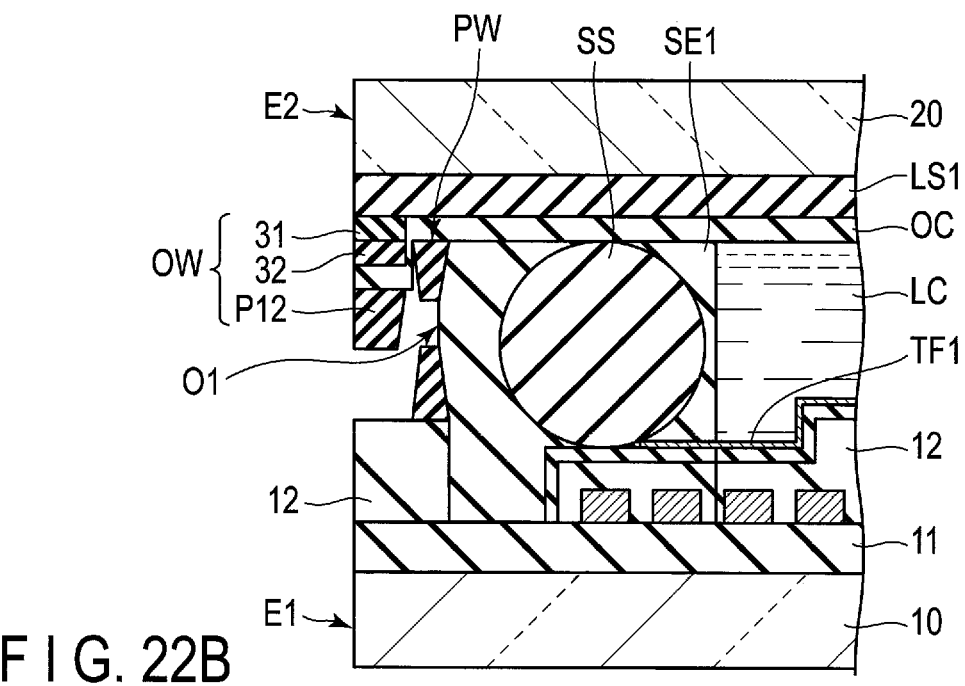
F I G. 22B

DISPLAY DEVICE

CROSS-REFERENCE TO RELATED APPLICATIONS

This application is based upon and claims the benefit of priority from Japanese Patent Application No. 2019-114315, filed Jun. 20, 2019, the entire contents of which are incorporated herein by reference.

FIELD

Embodiments described herein relate generally to a display device.

BACKGROUND

In the manufacturing of a liquid crystal display device, a manufacturing method of dropping a liquid crystal material on one substrate and bonding the other substrate to the one substrate has been put into practical use. In this manufacturing method, the liquid crystal material may contact a sealant which is not completely hardened yet, and the liquid crystal material may thrust into the sealant. In particular, when the liquid crystal material thrusts into the interface between the substrate and the sealant, the adhesion strength of the sealant may be reduced, and the reliability may be degraded.

To solve this problem, for example, a technology of disposing a wall-like spacer surrounding the entire periphery of the sealant has been proposed.

SUMMARY

The present disclosure generally relates to a display device.

According to an embodiment, a display device includes a first substrate, a second substrate, a first sealant surrounding a first chamber and a second chamber between the first substrate and the second substrate, a second sealant disposed between the first chamber and the second chamber, and a liquid crystal layer with which the first chamber and the second chamber are filled. The first chamber includes a first display portion including a first pixel. The second chamber includes a second display portion including a second pixel. The first sealant includes a first wall having a predetermined width and a second wall having a width less than the width of the first wall.

BRIEF DESCRIPTION OF THE DRAWINGS

FIG. 8 is an illustration for explaining the manufacturing method of the display panel PNL.

FIG. 10A is a cross-sectional view taken along line E-F of FIG. 9 in a manufacturing process.

FIG. 10B is a cross-sectional view showing a state where a liquid crystal material LM and a not-yet-hardened sealant SE are in contact with each other.

FIG. 18A is a cross-sectional view showing another configuration example.

FIG. 18B is a cross-sectional view showing another configuration example of the display panel PNL.

FIG. 20A is a cross-sectional view showing another configuration example.

FIG. 20B is a cross-sectional view showing another configuration example of the display panel PNL.

FIG. 21A is a cross-sectional view showing another configuration example.

FIG. 21B is a cross-sectional view showing another configuration example of the display panel PNL.

FIG. 22A is a cross-sectional view showing another configuration example.

FIG. 22B is a cross-sectional view showing another configuration example of the display panel PNL.

DETAILED DESCRIPTION

Figure 1:
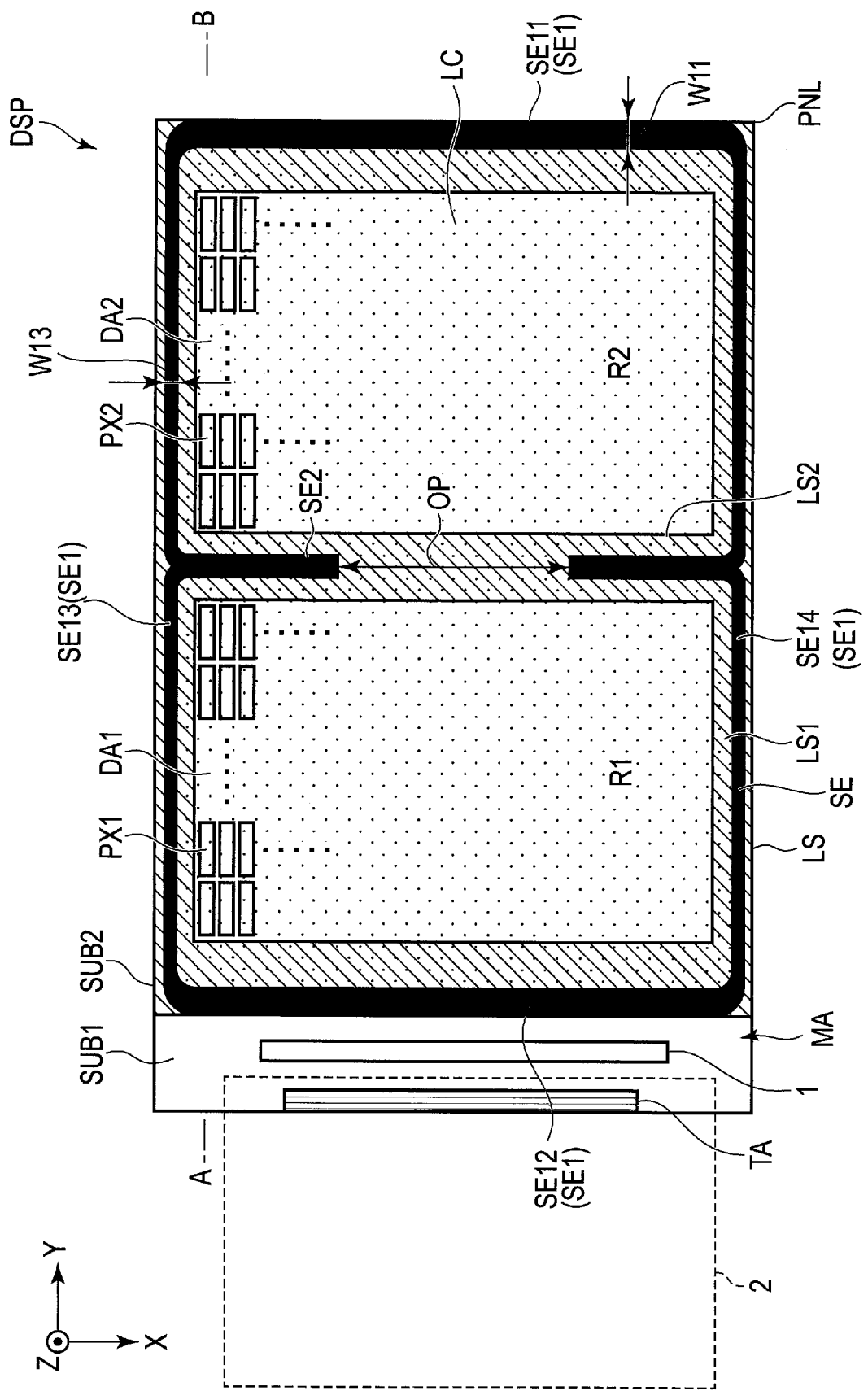
FIG. 1 is a plan view showing a configuration example of a display device DSP of the present embodiment.

In general, according to one embodiment, there is provided a display device including a first substrate, a second substrate, a first sealant surrounding a first chamber and a second chamber between the first substrate and the second substrate, a second sealant disposed between the first chamber and the second chamber, and a liquid crystal layer with which the first chamber and the second chamber are filled. The first chamber includes a first display portion including a first pixel. The second chamber includes a second display portion including a second pixel. The first sealant includes a first wall having a predetermined width and a second wall having a width less than the width of the first wall.

According to another embodiment, there is provided a display device including a first substrate, a second substrate, a first sealant surrounding a first chamber and a second chamber between the first substrate and the second substrate, a second sealant disposed between the first chamber and the second chamber, a liquid crystal layer with which the first chamber and the second chamber are filled, and an out-of-sealant structure formed outside the first sealant when viewed from the liquid crystal layer. The first chamber includes a first display portion including a first pixel. The second chamber includes a second display portion including a second pixel. At least a part of the out-of-sealant structure is formed along a periphery of the first sealant.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented, but such schematic illustration is merely exemplary, and in no way restricts the interpretation of the invention. In addition, in the specification and drawings, structural elements which function in the same or a similar manner to those described in connection with preceding drawings are denoted by the same reference numbers, and detailed explanations of them that are considered redundant may be arbitrarily omitted.

FIG. 1 is a plan view showing a configuration example of the display device DSP of the present embodiment. In the present embodiment, a liquid crystal display device will be described as an example of the display device DSP.

The display device DSP includes a display panel PNL and an IC chip 1. For the sake of convenience, a direction in which the short sides of the display panel PNL extend will be referred to as a first direction X, a direction in which the long sides of the display panel PNL extend will be referred to as a second direction Y, and a thickness direction of the display panel PNL will be referred to as a third direction Z. The first direction X, the second direction Y and the third direction Z are, for example, orthogonal to one other but may cross one another at an angle other than 90 degrees. Viewing the respective parts of the display device DSP toward an X-Y plane defined by the first direction X and the second direction Y will be referred to as planar view.

The display panel PNL includes a first display portion DA1 and a second display portion DA2 which display images in planar view. The first display portion DA1 and the second display portion DA2 are arranged in the second direction Y. The first display portion DA1 includes a plurality of first pixels PX1. The second display portion DA2 includes a plurality of second pixels PX2. The first pixels PX1 and the second pixels PX2 are arranged in a matrix in the first direction X and the second direction Y. The configuration of the first pixels PX1 and the second pixels PX2 will be described later. The first display portion DA1 and the second display portion DA2 have a rectangular shape in the example shown in FIG. 1 but may have another polygonal shape or a circular shape or an elliptical shape.

The display panel PNL includes a first substrate SUB1, a second substrate SUB2, a liquid crystal layer LC, a light shield LS and a sealant SE. The first substrate SUB1 overlaps the second substrate SUB2 in the third direction Z. The liquid crystal layer LC is made of a liquid crystal material including liquid crystal molecules and is provided between the first substrate SUB1 and the second substrate SUB2. The liquid crystal layer LC is disposed in the first display portion DA1 and the second display portion DA2 and functions as a light-modulating layer of the first pixels PX1 and the second pixels PX2.

The light shield LS is disposed in the second substrate SUB2. As indicated by hatched lines, the light shield LS is disposed so as to surround each of the first display portion DA1 and the second display portion DA2. In the example shown in FIG. 1, the light shield LS has a first light shield LS1 formed in the shape of a frame along the outer edges of the display panel PNL (or the outer edges of the second substrate SUB2) and a second light shield LS2 disposed between the first display portion DA1 and the second display portion DA2. The second light shield LS2 extends in the first direction X and connects with the first light shield LS1. Each of the first display portion DA1 and the second display portion DA2 corresponds to an inner region surrounded by the first light shield LS1 and the second light shield LS2.

Although not illustrated, a linear light shield extending in the first direction X or a linear light shield extending in the second direction Y may be disposed in the first display portion DA1 and the second display portion DA2. Alternatively, a linear light shield extending in the first direction X and a linear light shield extending in the second direction Y may be formed in separate processes in the first display portion DA1 and the second display portion DA2. Alternatively, a lattice-like light shield may be disposed in the first display portion DA1 and the second display portion DA2. This linear light shield or lattice-like light shield connect with the light shield LS.

The sealant SE bonds the first substrate SUB1 and the second substrate SUB2 together and seals in the liquid crystal layer LC. For example, the sealant SE is formed in the shape of a seamless loop and does not have any liquid crystal inlet. This sealant SE overlaps the light shield LS. In the example shown in FIG. 1, the sealant SE has a first sealant SE1 formed in the shape of a frame along the outer edges of the display panel PNL (or the outer edges of the second substrate SUB2) and a second sealant SE2 disposed between the display portion DA1 and the second display portion DA2. The entire first sealant SE1 overlaps the first light shield LS1. The entire second sealant SE2 overlaps the second light shield LS2. In addition, the second sealant SE2 extends in the first direction X and connects with the first sealant SE1. When this sealant SE is drawn by a dispenser, the first sealant SE1 and the second sealant SE2 can be unicursally drawn. Note that the shape of the sealant SE is not limited to the illustrated example. For example, the second sealant SE2 may be separated from the first sealant SE1.

The first substrate SUB1 has a mounting portion MA. The IC chip 1 is mounted on the mounting portion MA. The mounting portion MA includes a terminal portion TA for electrically connecting a flexible printed circuit board 2 indicated by a dotted line. Note that the IC chip 1 may be mounted on the flexible printed circuit board 2.

Figure 2:
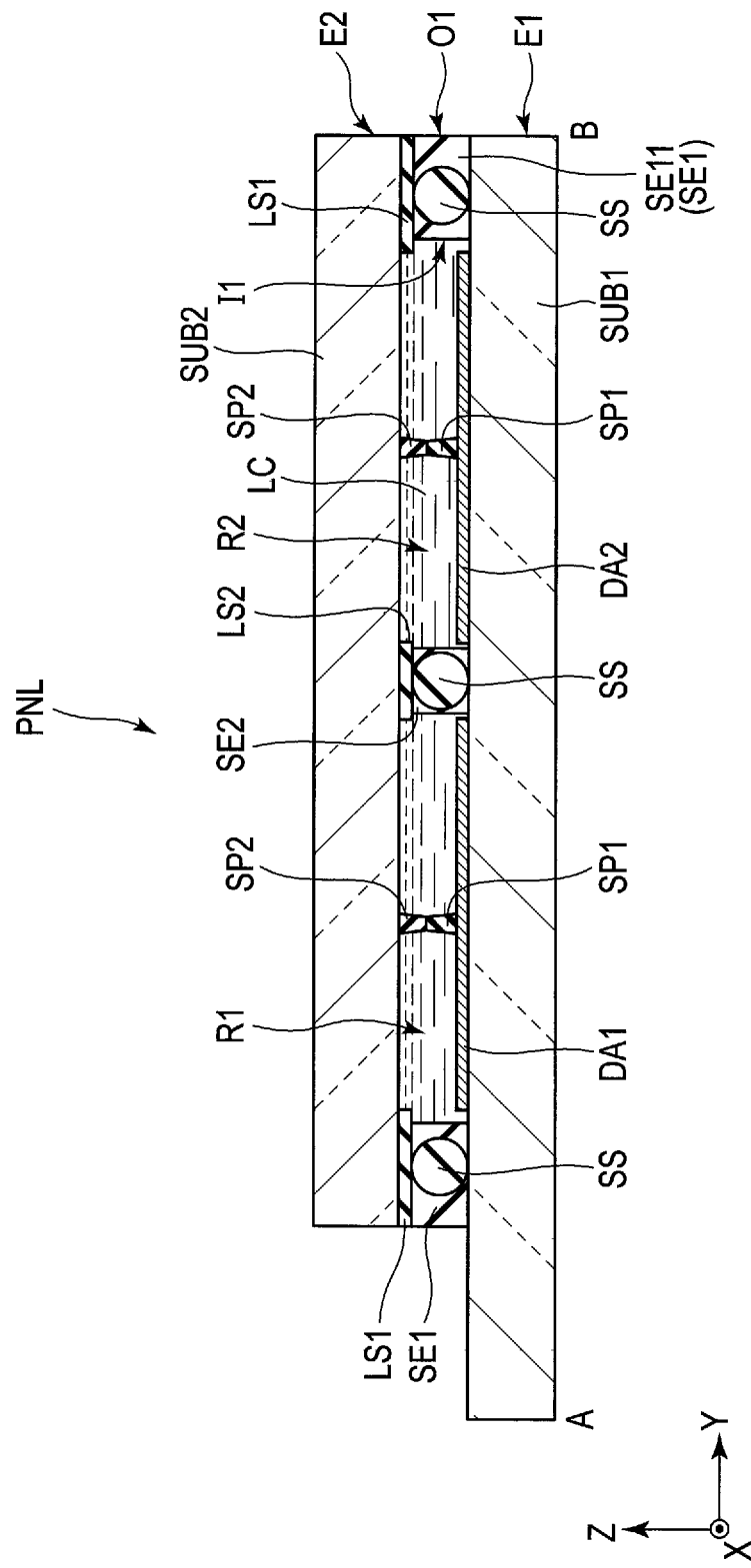
FIG. 2 is a cross-sectional view taken along line A-B shown in FIG. 1.

FIG. 2 is a cross-sectional view taken along line A-B shown in FIG. 1. Note that only main parts are shown in this cross-sectional view. The cell gap along the third direction Z between the first substrate SUB1 and the second substrate SUB2 is formed by a first spacer SP1 disposed in the first substrate SUB1 and a second spacer SP2 disposed in the second substrate SUB2. The first spacer SP1 and the second spacer SP2 are disposed in the first display portion DA1 and the second display portion DA2, respectively. In addition, the first sealant SE1 and the second sealant SE2 contain in-sealant spacers SS (or referred to also as fillers) and contribute to maintaining the cell gap.

The first sealant SE1 has an inner surface I1 which is in contact with the liquid crystal layer LC and an outer surface O1 which is located on the opposite side to the inner surface I1. In the example shown in FIG. 2, the outer surface O1 of a first portion SE11 overlaps a first end E1 of the first substrate SUB1 and a second end E2 of the second substrate SUB2 in the third direction Z. Note that the first end E1 and the second end E2 may project more than the outer surface O1 in the second direction Y.

The display panel PNL has a first chamber R1 and a second chamber R2. The first chamber R1 is surrounded by the first substrate SUB1, the second substrate SUB2, the first sealant SE1 and the second sealant SE2, and includes the first display portion DA1. The second chamber R2 is surrounded by the first substrate SUB1, the second substrate SUB2, the first sealant SE1 and the second sealant SE2, and includes the second display portion DA2. That is, the first sealant SE1 surrounds the first chamber R1 and the second chamber R2, and the second sealant SE2 is disposed between the first chamber R1 and the second chamber R2. The first chamber R1 and the second chamber R2 are filled with the liquid crystal layer LC.

The details of the sealant SE will be described with reference to FIG. 1 again.

The second sealant SE2 has at least one opening OP through which the first display portion DA1 and the second display portion DA2 communicate with each other. The second sealant SE2 has one opening OP in the example shown in FIG. 1 but may have a plurality of openings. In the opening OP, the liquid crystal material in the first display portion DA1 flows to the second display portion DA2 or the liquid crystal material in the second display portion DA2 flows to the first display portion DA1. In other words, a communication path (opening OP) through which the first chamber R1 and the second chamber R2 communicate with each other is formed in the second sealant SE2, and the first chamber R1, the second chamber R2 and the communication path are filled with the liquid crystal layer LC. Accordingly, the liquid crystal material of the liquid crystal layer LC can flow from the first chamber R1 to the second chamber R2 and from the second chamber R2 to the first chamber R1 through the communication path.

Incidentally, the first sealant SE1 has first portions SE11 and SE12 extending in the first direction X and second portions SE13 and SE14 extending in the second direction Y. A part of the first sealant SE1 is made wider. In the example shown in FIG. 1, the first portion SE11 is wider than the second portion SE13. The first portion SE12 is made wider in the same manner as the first portion SE11. The width of the sealant SE in the present specification is defined as a length in a direction orthogonal to an extension direction of each portion. For example, a width W11 of the first portion SE11 is a length in the second direction Y and a width W13 of the second portion SE13 is a length in the first direction X. The width W11 is greater than the width W13 (W11>W13). The width W11 of the first portion SE11 can be appropriately expanded within a range which overlaps the first light shield LS1.

In the first sealant SE1, a portion having a predetermined width as a first wall and a portion having a width are less than that of the first wall as a second wall. In the example shown in FIG. 1, the first portion SE11 having the width W11 corresponds to the first wall and the second portion SE13 having the width W13 corresponds to the second wall. In the configuration example shown in FIG. 1, substantially the entire first portions SE11 and SE12 are formed as the first walls which are wider than the second portions SE13 and SE14.

The outer surface O1 of the first sealant SE1 includes the outer surface of the first wall, which corresponds to the outermost surface. In the example shown in FIG. 2, the outer surface O1 of the first portion SE11 corresponds to the outermost surface of the first wall.

In addition, as shown in FIG. 1, each of the first wall and the second wall has a predetermined length in its extension direction. More specifically, each of the first wall and the second wall has a length corresponding to at least the length of several to hundreds of pixels and at most the length of a side of each display portion. That is, when the sealant is formed, the outer surface or inner surface of the sealant inevitably becomes a surface projecting and recessed continuously in small units of about several micrometers; however, the first wall and the second wall are not defined by the difference in width between these small projection and recess.

Figure 3:
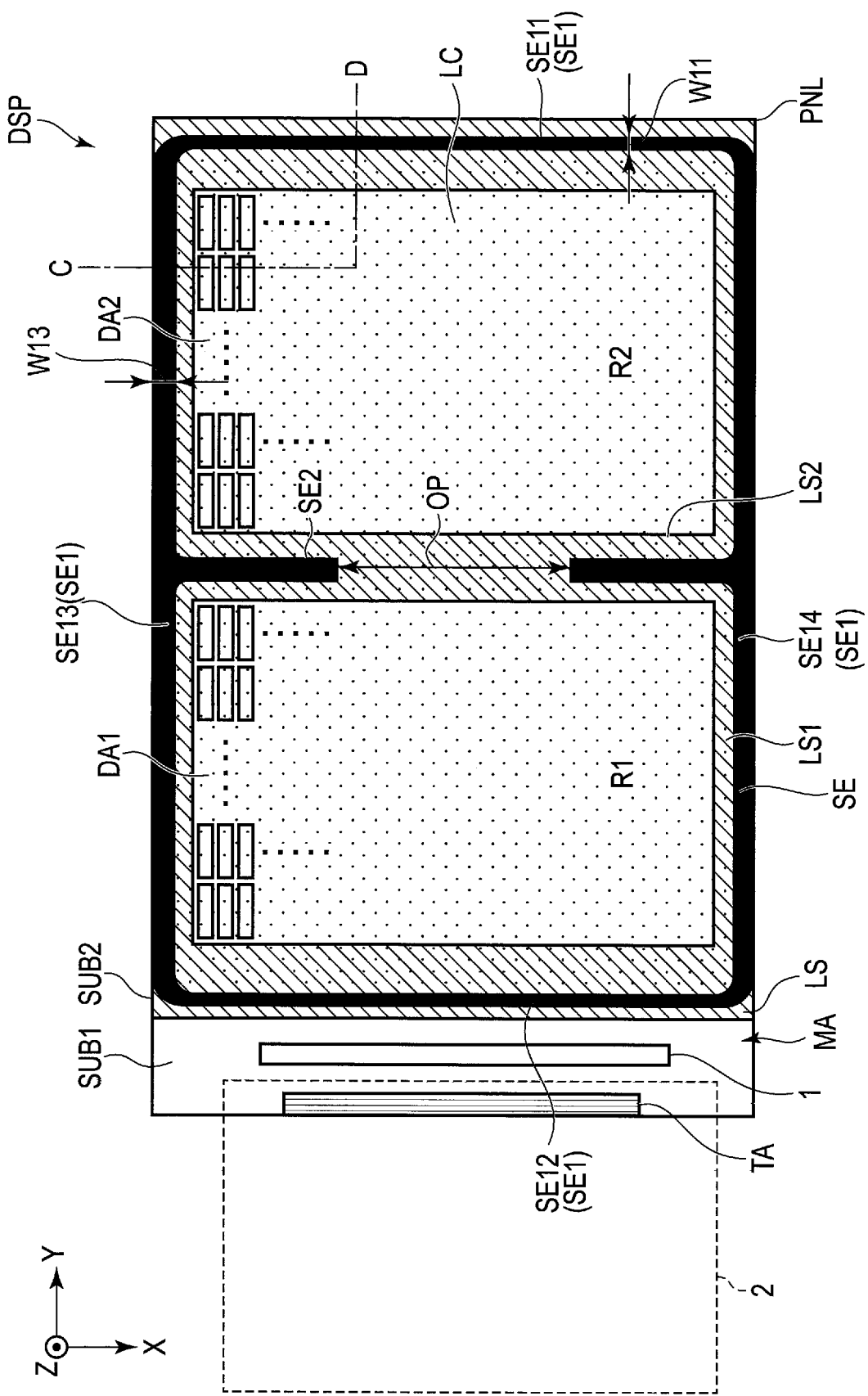
FIG. 3 is a plan view showing another configuration example of the display device DSP of the present embodiment.

FIG. 3 is a plan view showing another configuration of the display device DSP of the present embodiment. The configuration example shown in FIG. 3 differs from the configuration example shown in FIG. 1 in that the second portion SE13 is wider than the first portion SE11. The second portion SE14 is made wider in the same manner as the second portion SE13. That is, the width W13 is greater than the width W11 (W13>W11). The width W13 of the second portion SE13 can be appropriately expanded within a range which overlaps the first light shield LS1. In the configuration example shown in FIG. 3, substantially the entire second portions SE13 and SE14 are formed as the first walls which are wider than the first portions SE11 and SE12.

Figure 4:
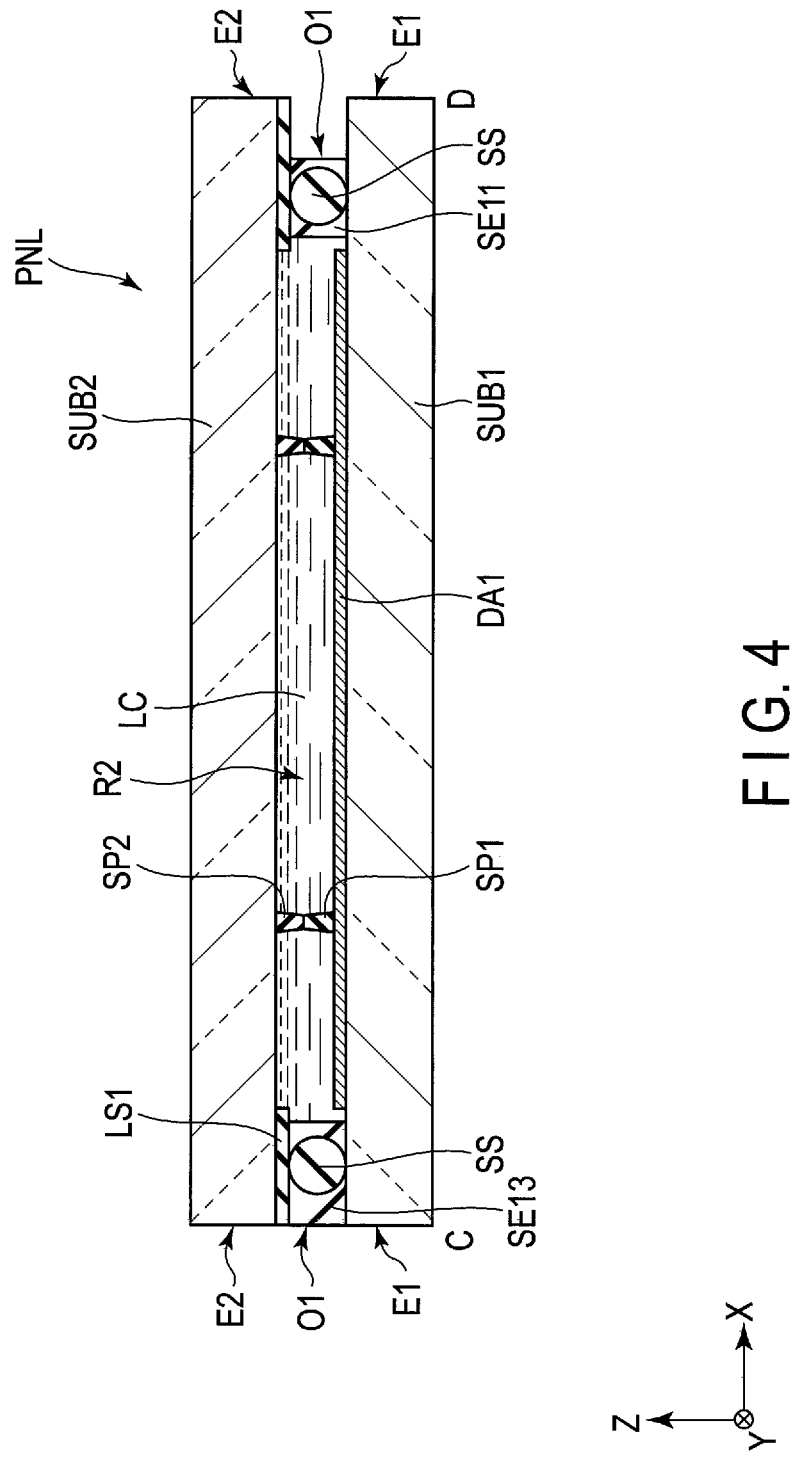
FIG. 4 is a cross-sectional view taken along line C-D shown in FIG. 3.

FIG. 4 is a cross-sectional view taken along line C-D shown in FIG. 3. The outer surface O1 of the second portion SE13 shown on the left side of the drawing overlaps the first end E1 of the first substrate SUB1 and the second end E2 of the second substrate SUB2 in the third direction Z. On the other hand, the outer surface O1 of the first portion SE11 shown on the right side of the drawing is located on an inner side with respect to the first end E1 and the second end E2. That is, the first end E1 and the second end E2 project more than the first portion SE11.

In the example shown in FIG. 4, the outer surface O1 of the second portion SE13 corresponds to the outermost surface of the first wall.

Figure 5:
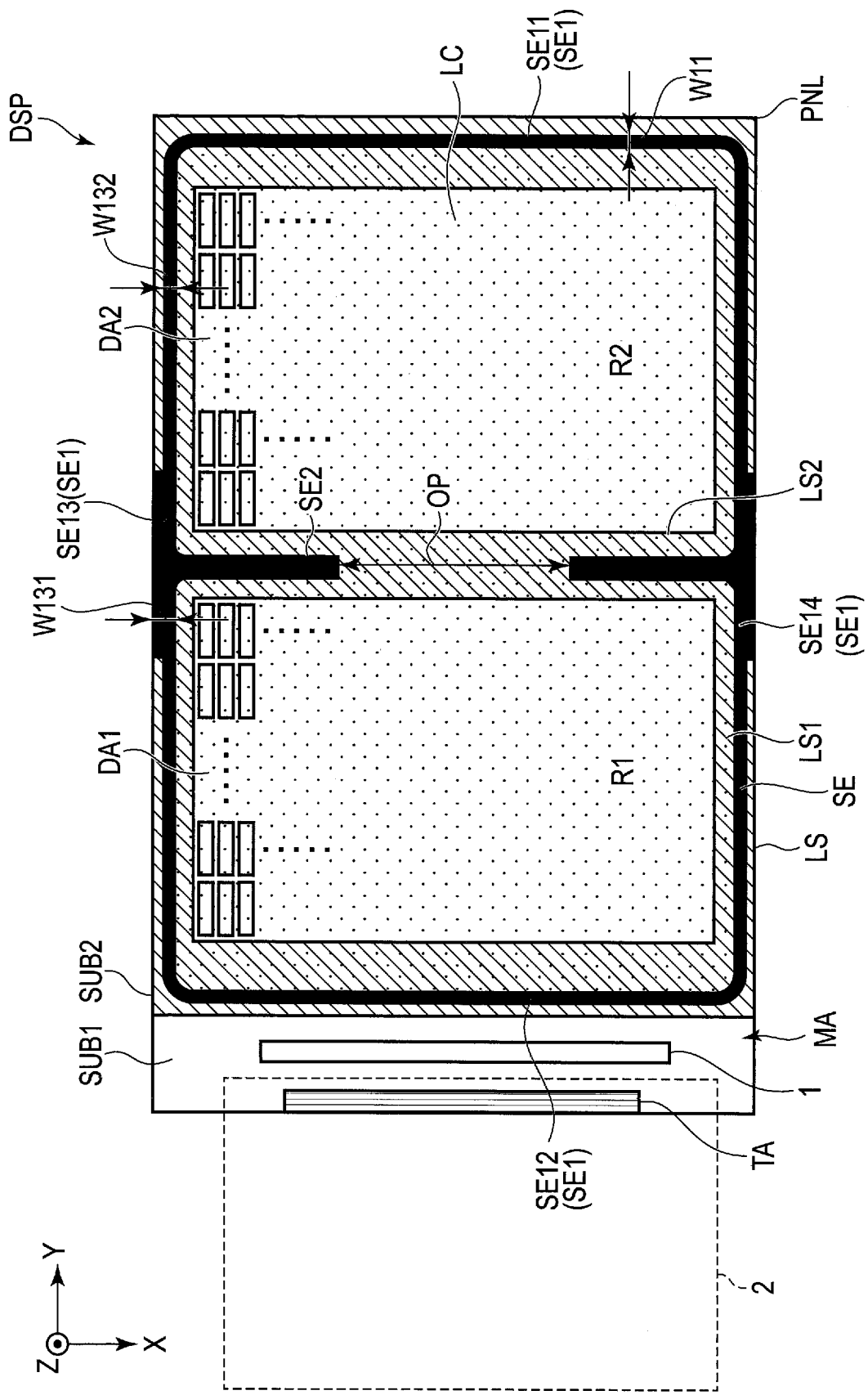
FIG. 5 is a plan view showing another configuration example of the display device DSP of the present embodiment.

FIG. 5 is a plan view showing another configuration example of the display device DSP of the present embodiment. In the configuration example shown in FIG. 5 differs from the configuration example shown in FIG. 3 in that a part of the second portion SE13 is made wider. For example, the second portion SE13 has a width W131 in the vicinity of the boundary between the second portion SE13 and the second sealant SE2 and has a width W132 in the other region. The width W131 is greater than the width W132 (W131>W132). In some cases, the width W132 may be substantially the same as the width W11 (W132≈W11). The second portion SE14 is formed in the same manner as the second portion SE13. In the configuration example shown in FIG. 5, parts of the second portions SE13 and SE14 are formed as the first walls, and the other parts of the second portions SE13 and SE14 are formed as the second walls.

Figure 6:
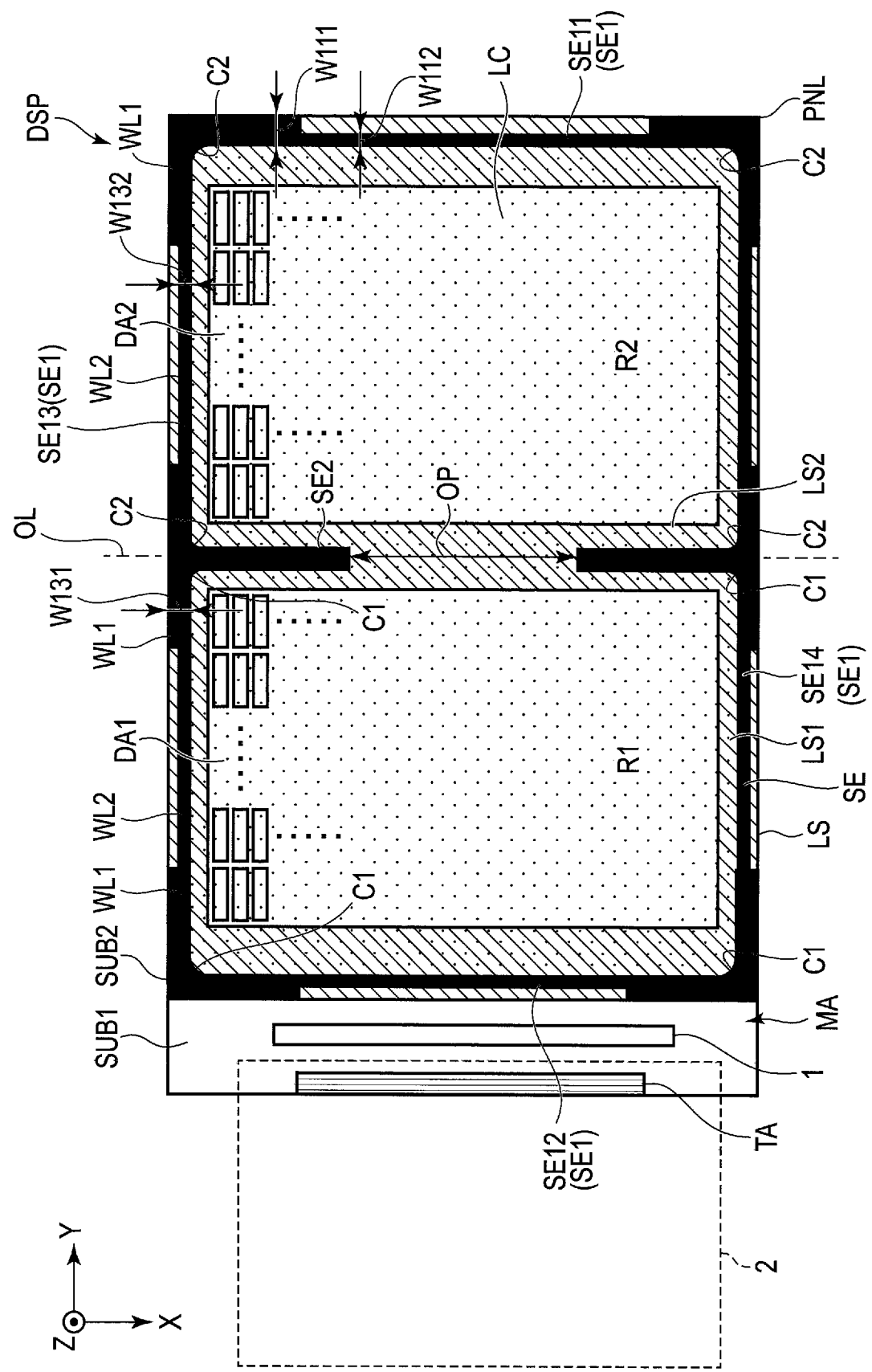
FIG. 6 is a plan view showing another configuration example of the display device DSP of the present embodiment.

FIG. 6 is a plan view showing another configuration example of the display device DSP of the present embodiment. The configuration example shown in FIG. 6 differs from the configuration example shown in FIG. 3 in that a part of the first portion SE11 and a part of the second portion SE13 are made wider.

The first portion SE11 has a width W111 in the vicinities of both ends and has a width W112 in the other region. The width W111 is greater than the width W112 (W111>W112). The first portion SE12 is formed in the same manner as the first portion SE11.

The second portion SE13 has the width W131 in the vicinity of the boundary between the second portion SE13 and the second sealant SE2 and in the vicinities of both ends and has a width W132 in the other region. The width W131 is greater than the width W132 (W131>W132). The second portion SE14 is formed in the same manner as the second portion SE13.

That is, in the configuration example shown in FIG. 6, regions including four corners C1 of the sealant SE surrounding the first display portion DA1 are made wider, respectively, and regions including four corners C2 of the sealant SE surrounding the second display portion DA2 are made wider, respectively.

In the configuration example shown in FIG. 6, parts of the first portions SE11 and SE12 are formed as the first walls, and the other parts of the first portions SE11 and SE12 are formed as the second walls. In addition, parts of the second portions SE13 and SE14 are made wider as the first walls, and the other parts of the second portions SE13 and SE14 are made wider as the second walls.

Furthermore, when attention is focused on, for example, the second portion SE13, the second portion SE13 has a plurality of first walls WL1 and a plurality of second walls WL2. The first walls WL1 and the second walls WL2 are alternately arranged in the second direction Y. The first walls WL1 are located so as to be symmetrical with respect to a center line OL of the second sealant SE2.

Next, an example of the manufacturing method of the display panel PNL will be described with reference to FIGS. 7 to 9. In the following manufacturing method, a comparative example where a part of the first sealant SE1 is not made wider as in the present embodiment will be described.

Figure 7:
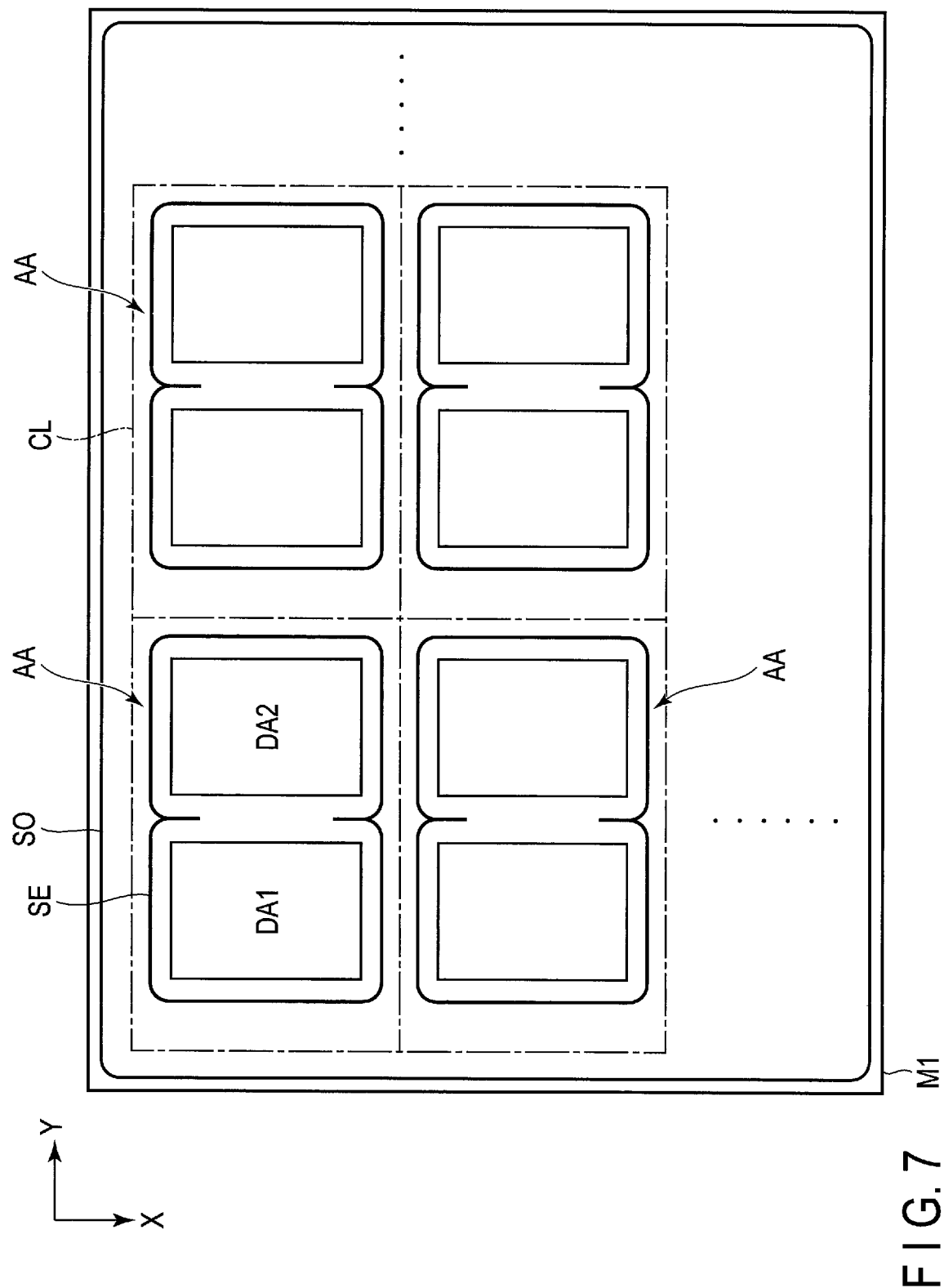
FIG. 7 is an illustration for explaining a manufacturing method of a display panel PNL.

First, a first mother substrate M1 is prepared as shown in FIG. 7. The first mother substrate M1 is formed based on a large glass substrate, and includes a plurality of active areas AA. A dash-dotted line in the drawing indicates a cut line CL of the first mother substrate M1. Each active area AA is surrounded by the cut line CL. When the first mother substrate M1 is cut along the cut line CL in a subsequent process, each active area AA constitutes the above-described first substrate SUB1. Each active area AA includes various insulating films, various conductive layers and the like.

In each active area AA of the first mother substrate M1, the sealant SE is formed so as to surround the first display portion DA1 and the second display portion DA2, and an outermost peripheral sealant SO is formed so as to surround all the active areas AA at the outermost periphery of the first mother substrate M1. The outermost peripheral sealant SO is formed in the shape of a continuous loop. The outermost peripheral sealant SO is disposed for protecting each active area AA from hydrofluoric acid when the glass substrates are chemically polished (thinned) by hydrofluoric acid after the first mother substrate M1 and the second mother substrate M2 are bonded together.

Subsequently, as shown in FIG. 8, the liquid crystal material LM is dropped on an inner side surrounded by the sealant SE in each active area AA. The amount of the liquid crystal material LM dropped is set based on the cell gap between the first substrate SUB1 and the second substrate SUB2, etc. In each of the first display portion DA1 and the second display portion DA2, the pitches of the positions of the liquid crystal material LM dropped along the first direction X are set to substantially the same pitch, and the pitches of the positions of the liquid crystal material LM dropped along the second direction Y are set to substantially the same pitch.

Figure 9:
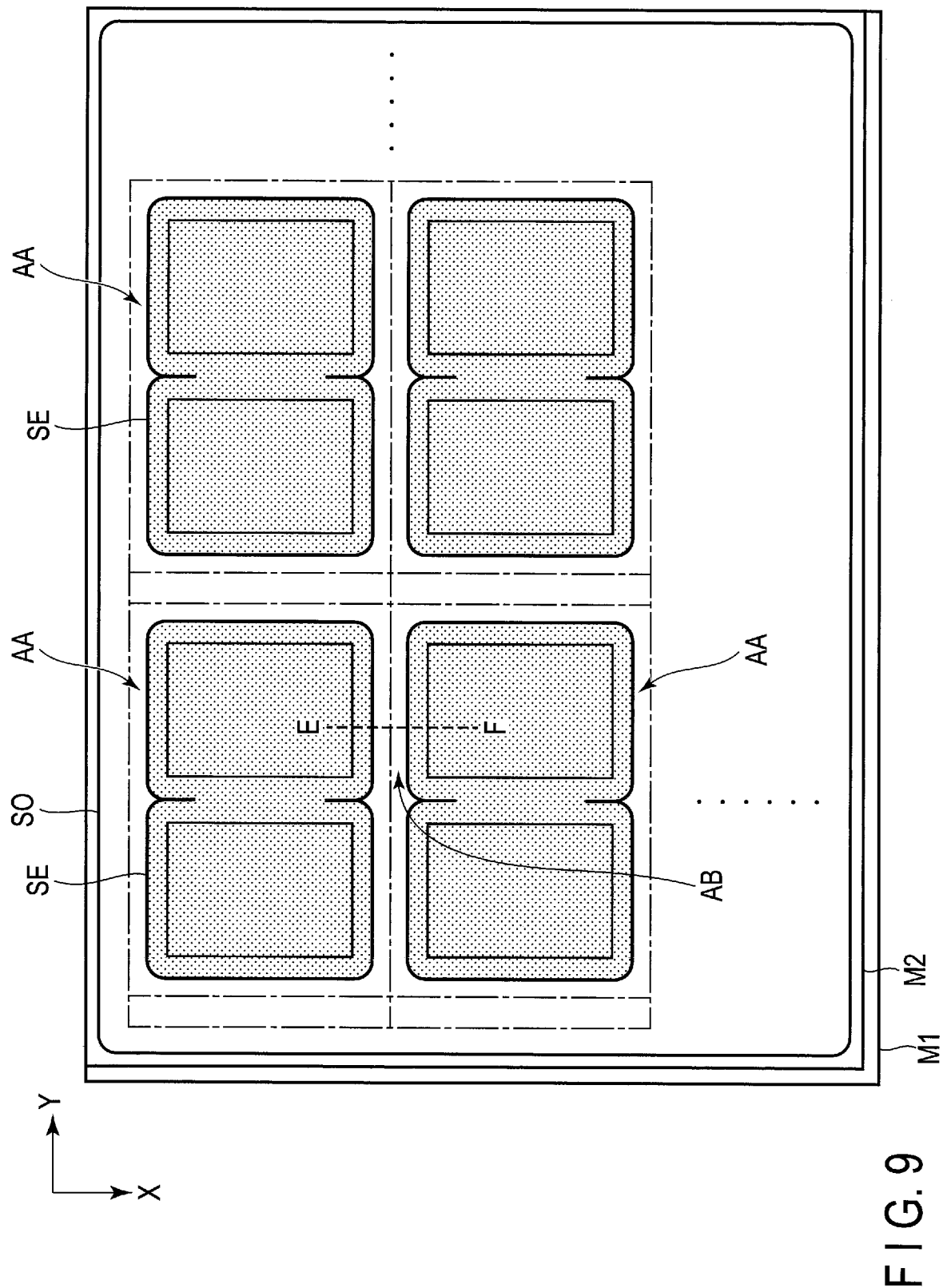
FIG. 9 is an illustration for explaining the manufacturing method of the display panel PNL.

Subsequently, as shown in FIG. 9, the second mother substrate M2 is prepared. The second mother substrate M2 is formed based on a large glass substrate. In a depressurized environment (for example, vacuum environment) where pressure is lower than atmospheric pressure, the first mother substrate M1 and the second mother substrate M2 are bonded together. When the first mother substrate M1 and the second mother substrate M2 are released to an atmospheric pressure environment, atmospheric pressure is applied to the first mother substrate M1 and the second mother substrate M2, the liquid crystal material LM which is dropped and the sealant SE and the outer peripheral sealant SO which are not hardened yet are spread, and the liquid crystal material LM and the sealant SE are brought into contact with each other in the active area AA. At this time, a depressurized region (for example, vacuum region) AB where pressure is lower than atmospheric pressure is formed between the sealants SE which are adjacent to each other. Accordingly, the sealant SE spreads inward toward the liquid crystal material LM and spreads outward toward the region AB.

FIGS. 10A and 10B are cross-sectional views taken along line E-F shown in FIG. 9.

FIG. 10A schematically shows a state immediately after the release to the atmospheric pressure environment. In the liquid crystal material LM, a stress F1 which causes it to spread toward the sealant SE is generated. In the sealant SE, a stress F2 which causes it to spread toward the liquid crystal material LM and a stress F3 which causes it to spread toward the region AB are generated. When the region AB is in a high-vacuum state, the stress F3 increases, and the stress F2 decreases, accordingly.

FIG. 10B schematically shows a state where the liquid crystal material LM and the not-yet-hardened sealant SE are in contact with each other. When the stress F2 decreases as shown in FIG. 10A and if the strength of the stress F1 exceeds the strength of the stress F2, the liquid crystal material LM thrusts into the not-yet-hardened sealant SE. In particular, the liquid crystal material LM tends to thrust into the interface between the sealant SE and the first mother substrate M1 or the interface between the sealant SE and the second mother substrate M2. This thrusting phenomenon of the liquid crystal material LM degrades the adhesion strength of the sealant SE to the respective substrates.

In a region where the position of the liquid crystal material LM dropped is located close to the sealant SE, the difference between the strength of the stress F1 and the strength of the stress F2 is large, and thrusting is more likely to occur. If all the drop positions are sufficiently separated from the sealant SE, thrusting is less likely to occur. However, due to various limitations such as the convenience of the manufacturing apparatus, the size of the screen and the size of the substrates, not all the drop positions are set to desired positions. Therefore, it is necessary to suppress thrusting while overcoming various limitations.

Accordingly, in the present embodiment, the volume of the region AB is reduced such that the stress F3 of the sealant SE in the process of manufacturing will be reduced.

Figure 11:
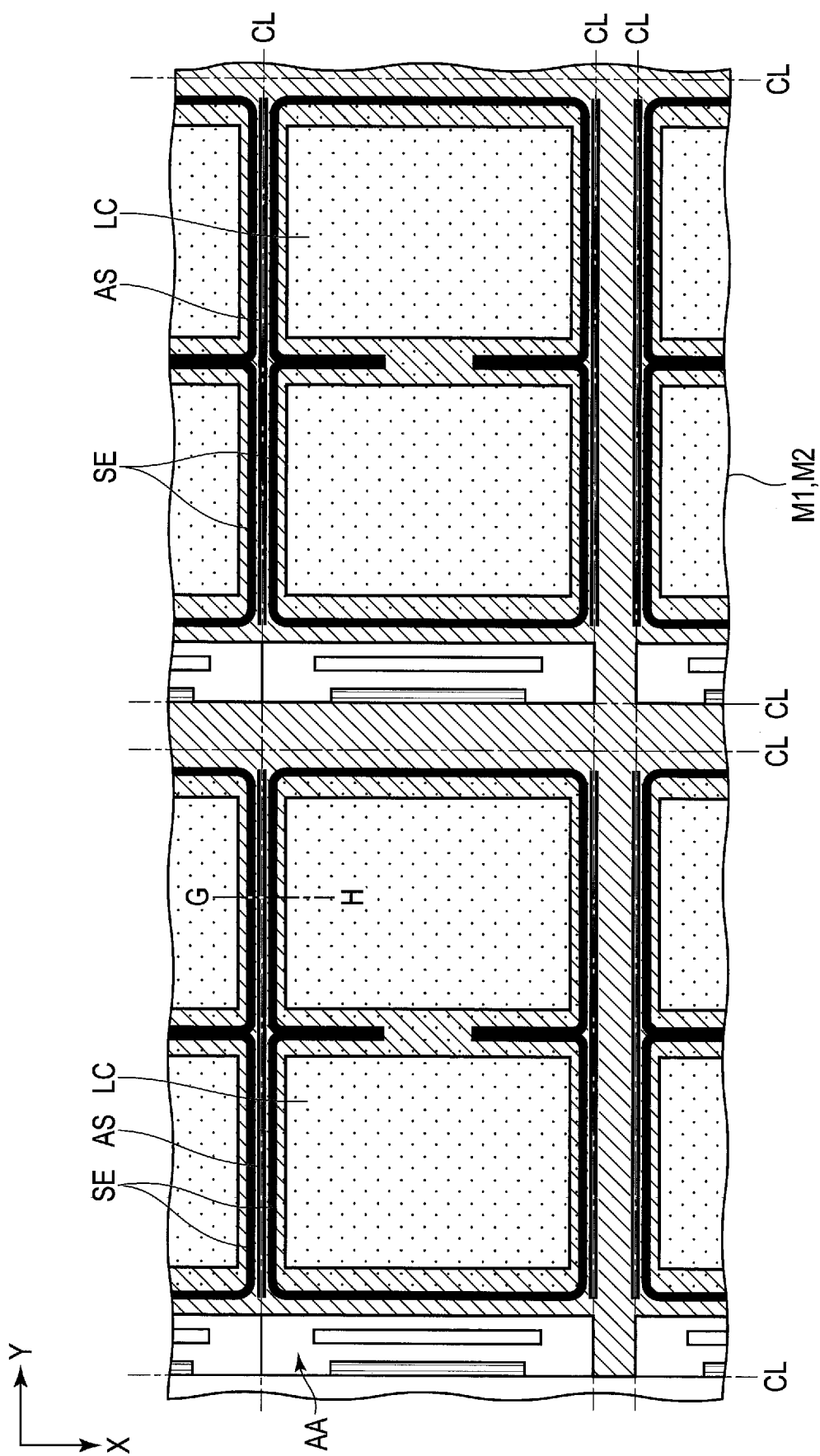
FIG. 11 is a plan view showing a configuration example of a first mother substrate M1 and a second mother substrate M2 which are bonded together.

FIG. 11 is a plan view showing a configuration example of the first mother substrate M1 and the second mother substrate M2 which are bonded together. The configuration example shown in FIG. 11 differs from the comparative example shown in FIG. 9 in that an additional sealant AS extending in the second direction Y is disposed between the sealants SE adjacent to each other in the first direction X. The additional sealant AS is formed of the same material as the sealants SE. The additional sealant AS is disposed, for example, on the cutting line CL. In addition, in a region where the adjacent sealants SE are located close to each other, the additional sealant AS may be disposed so as to be in contact with both of the adjacent sealants SE. In other words, the gap between the sealants SE adjacent to each other in the first direction X is filled with the additional sealant AS.

In addition to the illustrated additional sealant AS, an additional sealant extending in the first direction X may be disposed. Furthermore, an additional sealant may be disposed in a region which deviates from the cut line CL. In the illustrated configuration example, each active area AA which is cut out along the cut line CL forms, for example, the configuration example shown in FIG. 3. After the additional sealant AS and the sealant SE are hardened, the additional sealant AS and the sealant SE are integrated with each other. Therefore, the boundary between them is hardly visually recognized, and the wide sealant SE is formed. After the additional sealant AS disposed on the cut line CL is cut up, the additional sealant AS forms the outer surface O1 of the second portion SE13 shown in FIG. 4, etc.

Figure 12B:
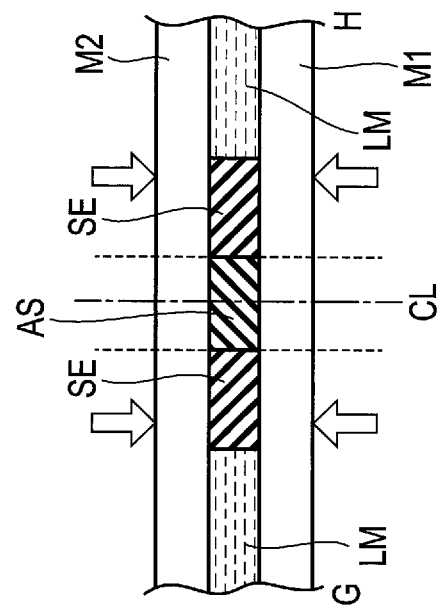
FIG. 12B is a cross-sectional view showing a state where the liquid crystal material LM and the not-yet-hardened sealant SE are in contact with each other.
Figure 12A:
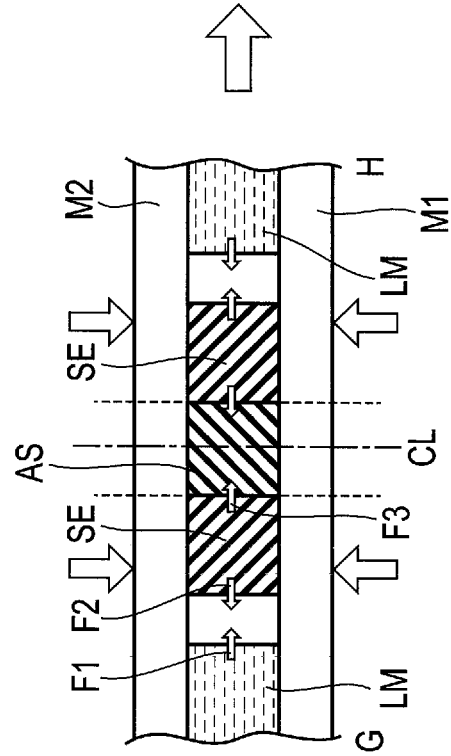
FIG. 12A is a cross-sectional view taken along line G-H of FIG. 11 in a manufacturing process.

FIGS. 12A and 12B are cross-sectional views taken along line G-H shown in FIG. 11.

FIG. 12A schematically shows a state immediately after the release to the atmospheric pressure environment. FIG. 12B schematically shows a state where the liquid crystal material LM and the not-yet-hardened sealant SE are in contact with each other. When the atmospheric pressure is applied to the first mother substrate M1 and the second mother substrate M2, the sealant SE and the additional sealant AS which are not hardened yet are spread, and the sealant SE and the additional sealant AS are brought into contact with each other. Therefore, the outward spreading of the sealant SE is suppressed, and the depressurized region AB shown in FIG. 10B is not formed between the adjacent sealants SE. Accordingly, the stress F3 of the sealant SE is reduced, and the reduction of the stress F2 is suppressed. Accordingly, the difference between the strength of the stress F1 and the strength of the stress F2 is reduced, and the thrusting of the liquid crystal material LM (in particular, the thrusting into the interface between the sealant and the substrate) is suppressed. Consequently, the reduction of the adhesion strength of the sealant SE is suppressed without various limitations, and the degradation in reliability is suppressed.

Figure 13:
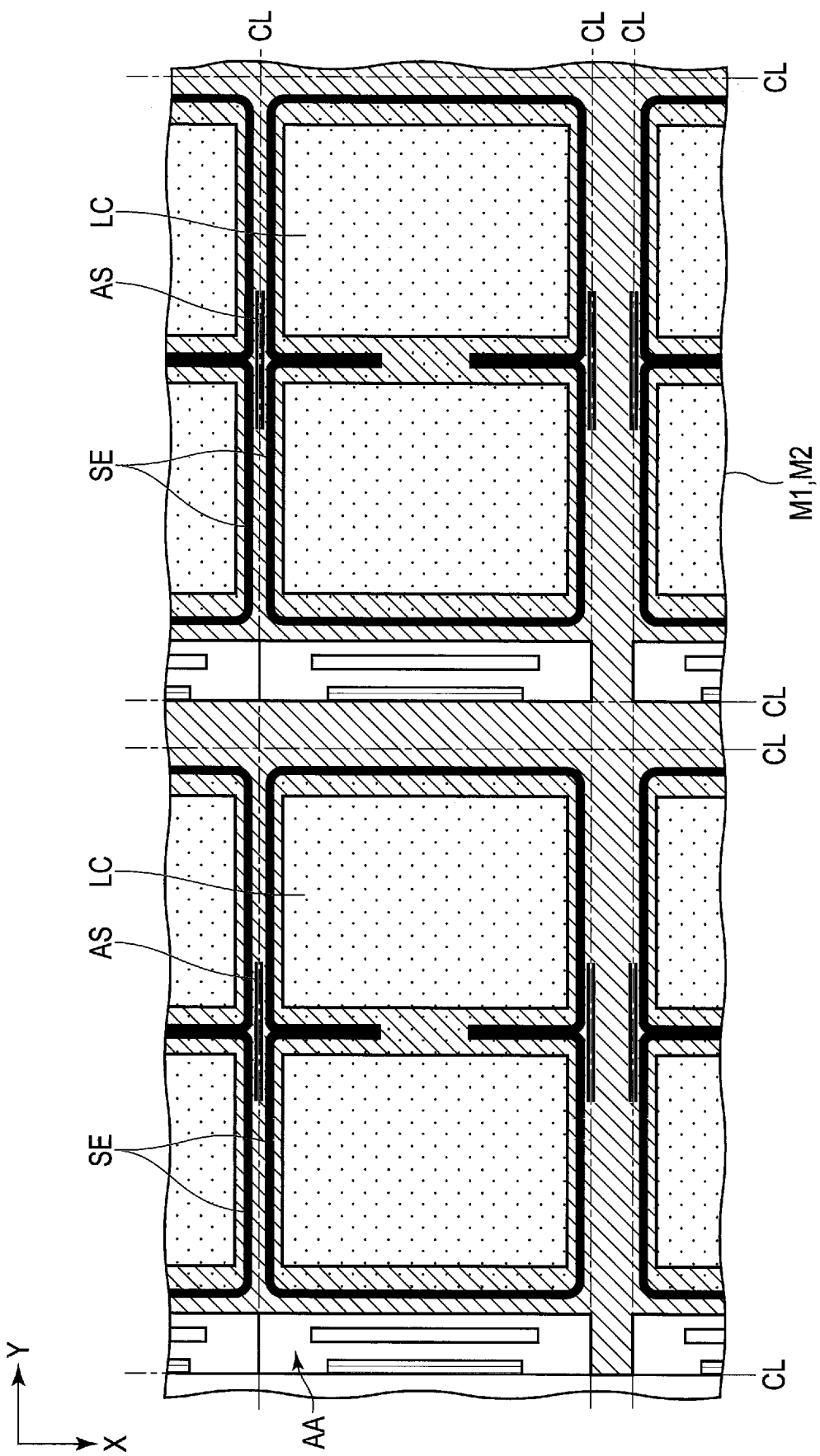
FIG. 13 is a plan view showing another configuration example of the first mother substrate M1 and the second mother substrate M2 which are bonded together.

FIG. 13 is a plan view showing another configuration example of the first mother substrate M1 and the second mother substrate M2 which are bonded together. The configuration example shown in FIG. 13 differs from the configuration example shown in FIG. 11 in that an additional sealant AS extending in the second direction Y is disposed in a part of a region between the sealants SE adjacent to each other in the first direction X. This additional sealant AS is disposed in the vicinity of the boundary between the first sealant SE1 and the second sealant SE2 of the sealant SE.

In the illustrated configuration example, each active area AA which is cut out along the cut line CL forms, for example, the configuration example shown in FIG. 5.

Figure 14:
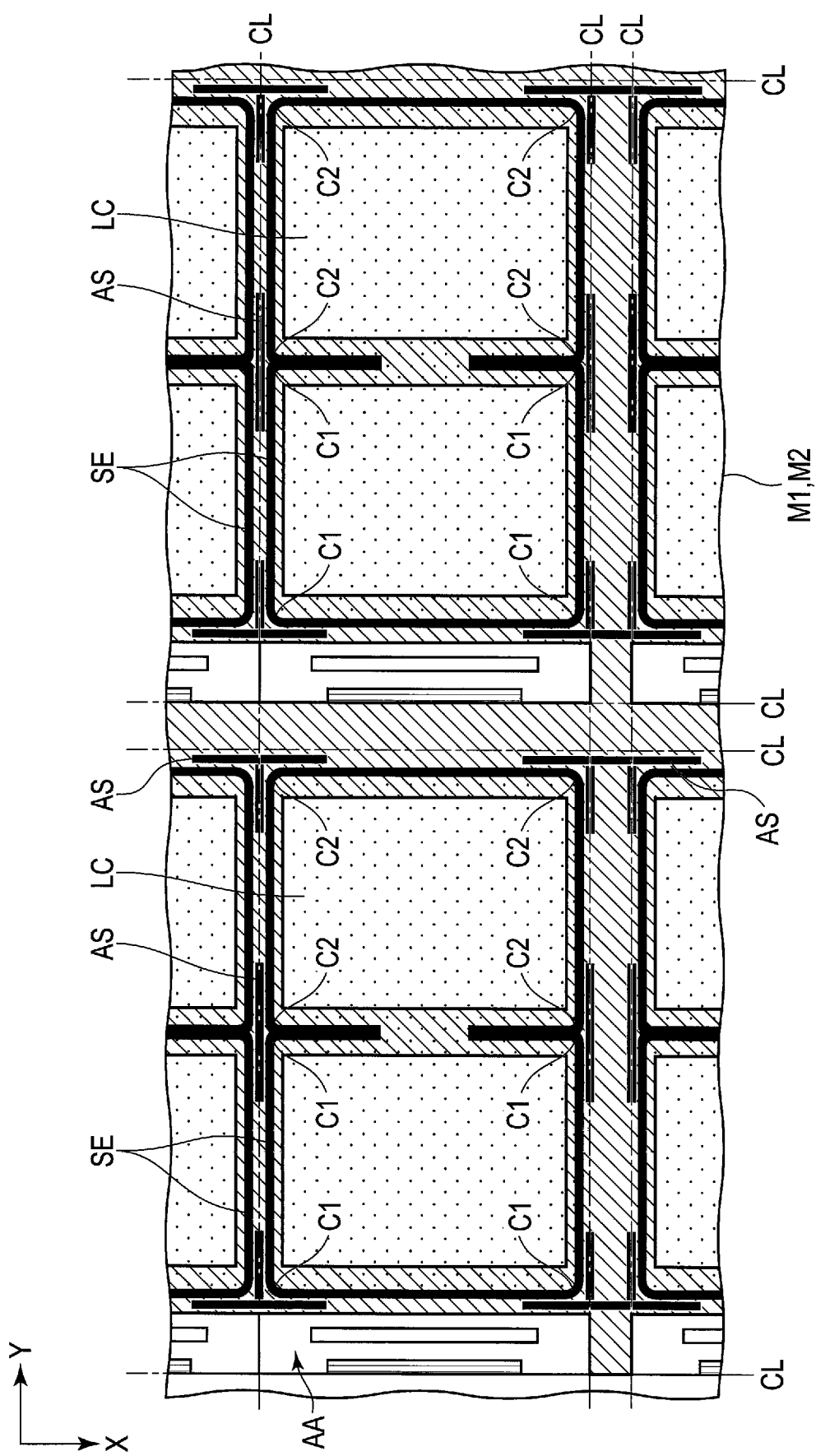
FIG. 14 is a plan view showing another configuration example of the first mother substrate M1 and the second mother substrate M2 which are bonded together.

FIG. 14 is a plan view showing another configuration example of the first mother substrate M1 and the second mother substrate M2 which are bonded together. The configuration example shown in FIG. 14 differs from the configuration example shown in FIG. 11 in that an additional sealant AS extending in the second direction Y is disposed in a part of a region between the sealants SE adjacent to each other in the first direction X and an additional sealant AS extending in the first direction X is disposed in a part of a region between the sealants SE adjacent to each other in the second direction Y. These additional sealants AS are disposed in the regions including the corners C1 and the regions including the corners C2 of the sealant SE.

In the illustrated configuration example, each active area AA which is cut out along the cut line CL forms, for example, the configuration example shown in FIG. 6.

Next, a specific example of the display panel PNL will be described.

Figure 15:
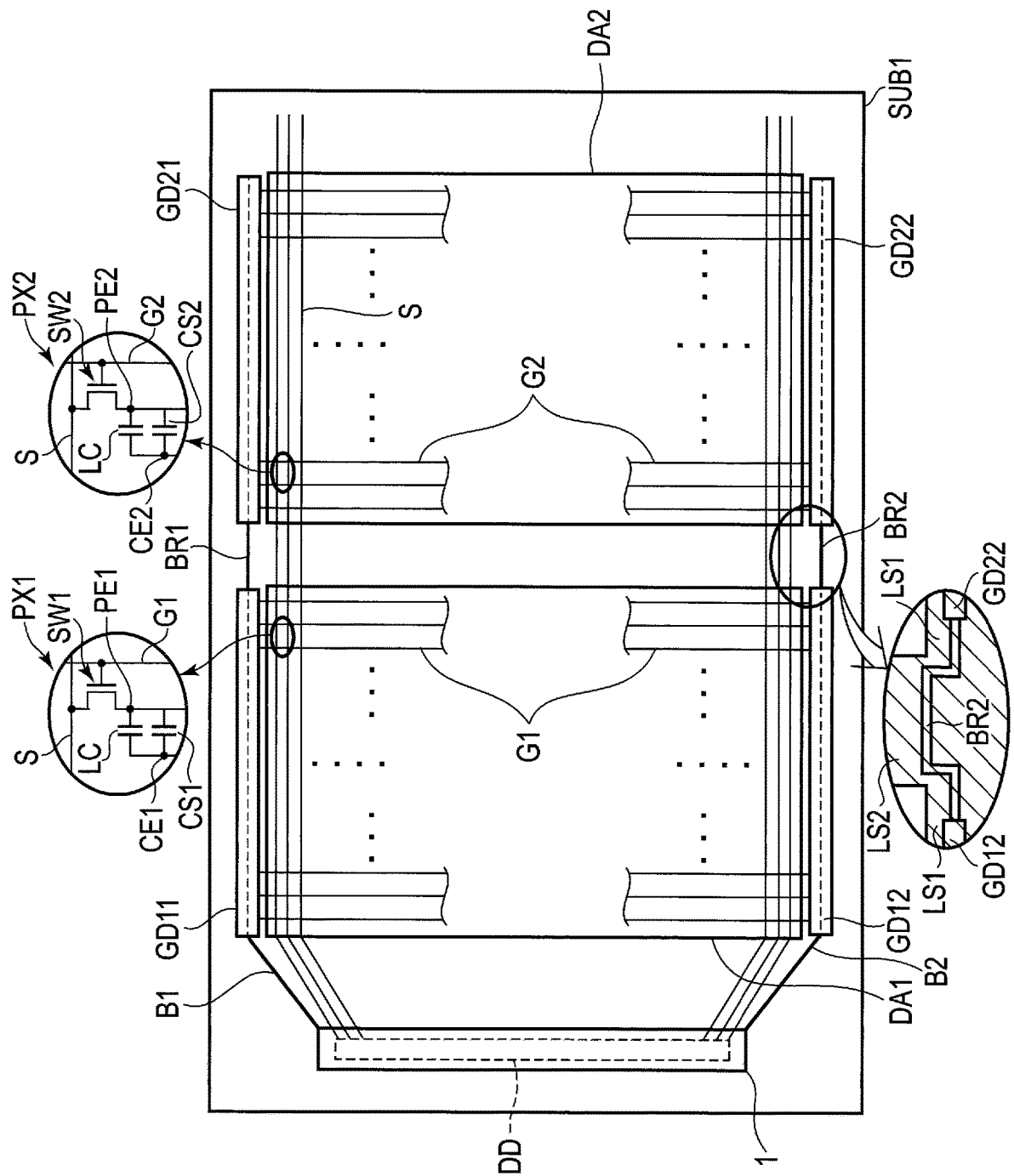
FIG. 15 is an illustration for explaining the main configuration of a first substrate SUB1.

FIG. 15 is an illustration for explaining the main configuration of the first substrate SUB1.

The first substrate SUB1 includes a plurality of scanning lines G1 disposed in the first display portion DA1, a plurality of scanning lines G2 disposed in the second display portion DA2, a plurality of signal lines S disposed over the first display portion AD1 and the second display portion DA2, gate drivers GD11 and GD12 disposed close to the display portion DA1, and gate drivers GD21 and GD22 disposed close to the second display portion DA2.

The gate drivers GD11 and GD21 are connected to each other via a bus line B1. The gate drivers GD12 and GD22 are connected to each other via a bus line B2. The bus lines B1 and B2 are electrically connected to, for example, the IC chip 1. Each of the bus lines B1 and B2 includes, for example, a line for supplying a start pulse, a line for supplying a clock, a high-potential power supply line (VGH), a low-potential power supply line (VGL) and the like. A region between the gate driver GD11 and the gate driver GD21 of the bus line B1 will be referred to as a relay portion BR1. In addition, a region between the gate driver GD12 and the gate driver GD22 of the bus line B2 will be referred to as a relay portion BR2. In these relay portions BR1 and BR2, circuit configurations are not included.

Now, attention will be focused on the relationship between the first light shield LS1 and the second light shield LS2 shown in FIG. 1, etc., and the gate drivers GD12 and GD22. The gate drivers GD12 and GD22 overlap the first light shield LS1. The relay portion BR2 is disposed in a connection portion (crossing portion) in which the first light shield LS1 and the second light shield LS2 are connected to each other (cross each other). The circuit configurations of the gate drivers GD12 and GD22 are not disposed in the vicinity of such a connection portion. Note that the relay portion BR1 is disposed in a connection portion in the same manner.

The scanning lines G1 are electrically connected to at least one of the gate drivers GD11 and GD12. The scanning lines G2 are electrically connected to at least one of the gate drivers GD21 and GD22. Note that no scanning line is disposed in a region overlapping the second light shield LS2 and the second sealant SE2 shown in FIG. 1. In addition, no line crossing the signal lines S is disposed in the region overlapping the second light shield LS2 and the second sealant SE2.

A display driver DD is incorporated in the IC chip 1. The display driver DD outputs a signal necessary for image display such as a video signal to the display panel PNL in an image display mode of displaying an image. The signal lines S are electrically connected to the display driver DD. Each signal line S is electrically connected to the first pixel PX1 and the second pixel PX2. That is, each signal line S is continuously disposed over the first display portion DA1 and the second display portion DA2 and crosses the second light shield LS2 shown in FIG. 1. The signal lines S include signal lines crossing the second sealant SE2 and signal lines overlapping the opening OP in the second light shield LS2.

In the first pixel PX1, the first substrate SUB1 includes a switching element SW1, a pixel electrode PE1 and a common electrode CE1. The switching element SW1 is electrically connected to the scanning line G1 and the signal line S. The pixel electrode PE1 is electrically connected to the switching element SW1. The common electrode CE1 is disposed equally for the first pixels PX1. A storage capacitance CS1 is formed between an electrode having the same potential as the common electrode CE1 and an electrode having the same potential as the pixel electrode PE1, for example. In the first display portion DA1, the liquid crystal layer LC is driven by an electric field generated between the pixel electrode PE1 and the common electrode CE1.

In the second pixel PX2, the first substrate SUB1 includes a switching element SW2, a pixel electrode PE2 and a common electrode CE2. The switching element SW2 is electrically connected to the scanning line G2 and the signal line S. The pixel electrode PE2 is electrically connected to the switching element SW2. The common electrode CE2 is disposed equally for the second pixels PX2. A storage capacitance SC2 is formed between an electrode having the same potential as the common electrode CE2 and an electrode having the same potential as the pixel electrode PE2, for example. In the second display portion DA2, the liquid crystal layer LC is driven by an electric field generated between the pixel electrode PE2 and the common electrode CE2.

Note that the first pixel PX1 and the second pixel PX2 include color filters and the color filters may be disposed in the first substrate SUB1 or may be disposed in the second substrate SUB2. In addition, the common electrodes CE1 and CE2 may be disposed in the second substrate SUB2.

Figure 16:
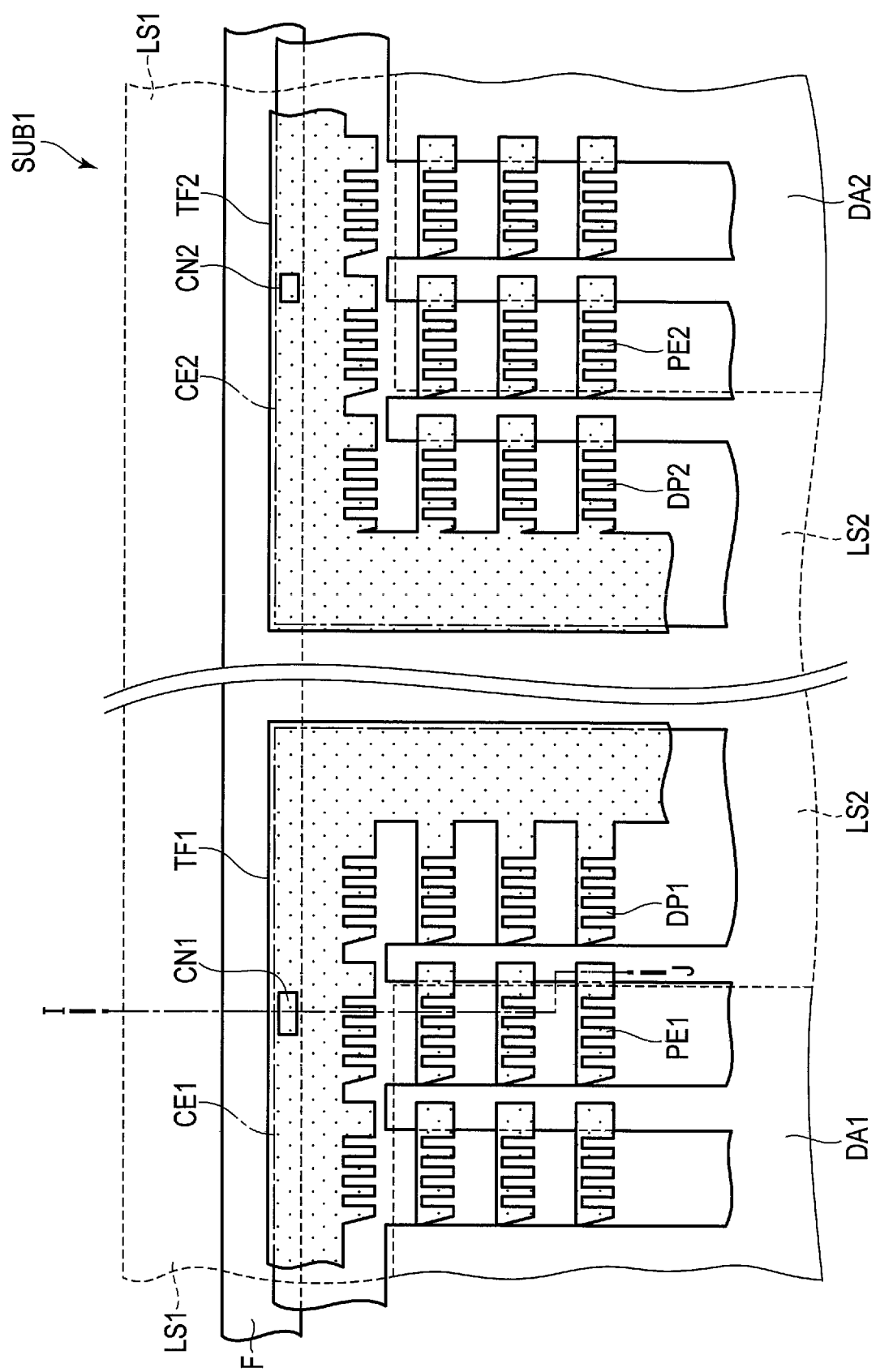
FIG. 16 is a plan view showing a part of a first display portion DA1 and a part of a second display portion DA2 in the first substrate SUB1.

FIG. 16 is a plan view showing a part of the first display portion DA1 and a part of the second display portion DA2 in the first substrate SUB1. Here, only main parts necessary for explanation are illustrated, the first light shield LS1 and the second light shield LS2 are indicated by dotted lines, and the linear light shield or lattice-like light shield disposed in the first display portion DA1 and the second display portion DA2 is not illustrated.

The first substrate SUB1 includes a feed line F and conductive films TF1 and TF2. The feed line F is a line for supplying a common potential to the common electrodes CE1 and CE2, and as will be described later, the feed line F is disposed in the same layer as the signal line S, for example. Each of the conductive films TF1 and TF2 overlaps the first light shield LS1 and the second light shield LS2. The conductive film TF2 is separated from the conductive film TF1. A part of the conductive film TF1 and a part of the conductive film TF2 overlap the feed line F. The conductive film TF1 is disposed around the first display portion DA1 and is separated from the pixel electrode PE1. The conductive film TF1 has a dummy pattern DP1 formed in substantially the same shape as the pixel electrode PE1 on its side adjacent to the first display portion DA1. The conductive film TF2 is disposed around the second display portion DA2 and is separated from the pixel electrode PE2. The conductive film TF2 has a dummy pattern DP2 formed in substantially the same shape as the pixel electrodes PE2 on its side adjacent to the second display portion DA2. Each of the dummy patterns DP1 and DP2 overlaps the first light shield LS1 and the second light shield LS2.

The common electrode CE1 overlaps the pixel electrode PE1 in the first display portion DA1. In addition, the common electrode CE1 overlaps the conductive film TF1 including the dummy pattern DP1. In a connection portion CN1 overlapping the first light shield LS1, the feed line F, the common electrode CE1 and the conductive film TF1 are electrically connected to one another.

The common electrode CE2 is separated from the common electrode CE1. The common electrode CE2 overlaps the pixel electrode PE2 in the second display portion DA2. In addition, the common electrode CE2 overlaps the conductive film TF2 including the dummy pattern DP2. In a connection portion CN2 overlapping the first light shield LS1, the feed line F, the common electrode CE2 and the conductive film TF2 are electrically connected one another.

Figure 17:
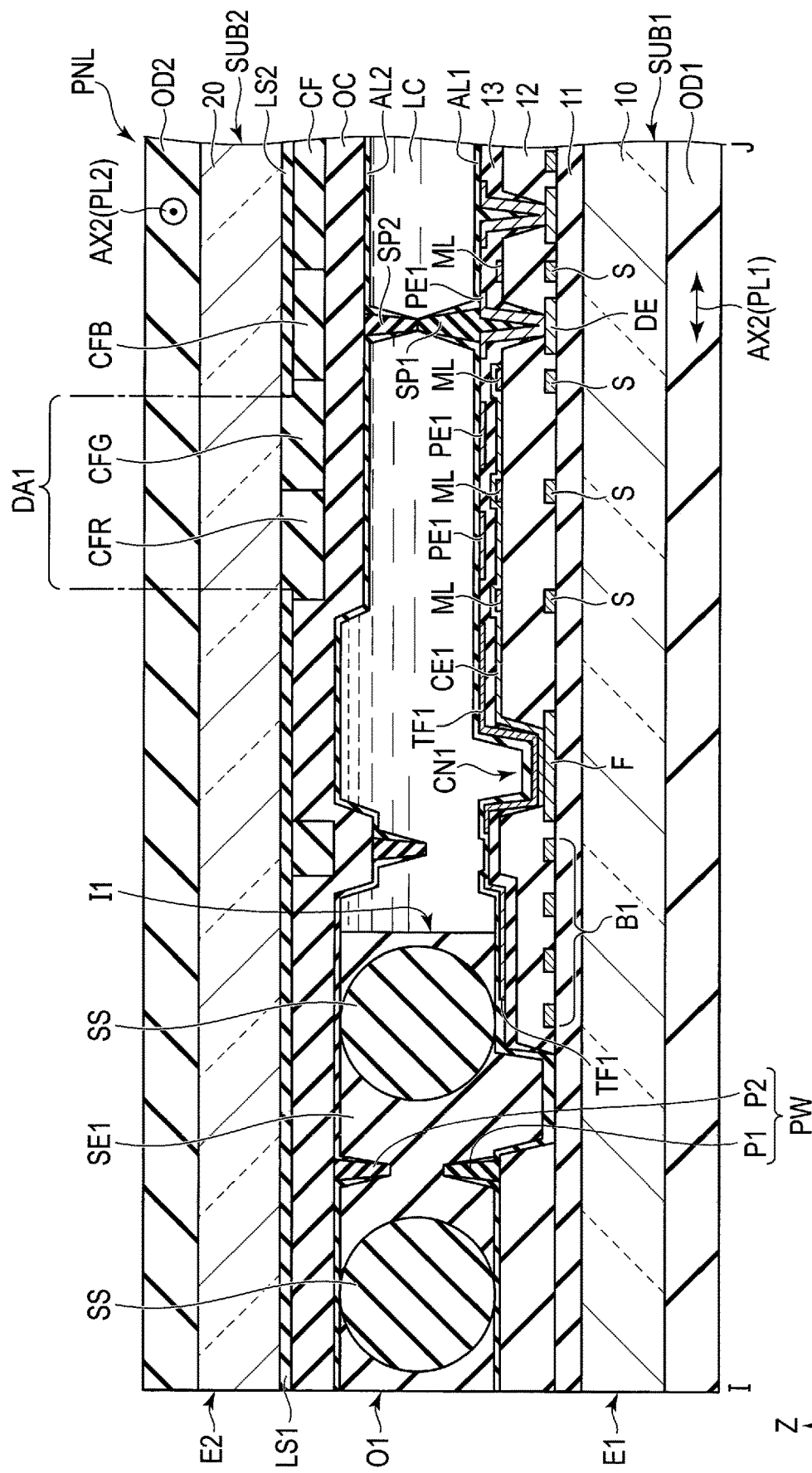
FIG. 17 is a cross-sectional view of the display panel PNL taken along line I-J shown in FIG. 16.

FIG. 17 is a cross-sectional view of the display panel PNL taken along line I-J shown in FIG. 16. Although the cross-sectional structure of the first display portion DA1 will be described here, the second display portion DA2 has substantially the same cross-sectional structure as the first display portion DA1.

The first substrate SUB1 includes an insulating substrate 10, insulating films 11 to 13, the bus line B1, the feed line F, the signal line S, a metal line ML, the common electrode CE1, the conductive film TF1, an alignment film AL1 and the like. Note that the scanning lines G1 and G2 and the switching elements SW1 and SW2 shown in FIG. 15 are disposed between, for example, the insulating substrate 10 and the insulating film 11. The bus line B1, the feed line F, the signal line S and a drain electrode DE of the switching element are disposed between the insulating films 11 and 12. The metal line ML is disposed between the insulating films 12 and 13. Note that the metal line ML extends in the second direction Y and is disposed so as to overlap the signal line S in planar view. The metal line ML is in contact with the common electrode CE1. That is, the common electrode CE1 is electrically connected to the metal line ML. Accordingly, the common electrode CE1 is made less resistive in the first display portion DA1.

The conductive film TF1 and the pixel electrode PE1 are disposed between the insulating film 13 and the alignment film AL1. The insulating film 13 is interposed between the common electrode CE1 and the conductive film TF1 and between the common electrode CE1 and the pixel electrode PE1. The common electrode CE1 is in contact with the feed line F in the connection portion CN1 and the conductive film TF1 is in contact with the common electrode CE1 in the connection portion CN1, and they are electrically connected to one another. Accordingly, the common potential is supplied from the feed line F to the common electrode CE1 and the conductive film TF1.

The pixel electrode PE1 is in contact with the drain electrode DE of the switching element, and they are electrically connected to each other. A first spacer SP1 is disposed in a connection portion in which the pixel electrode PE1 and the drain electrode DE are connected to each other.

The second substrate SUB2 includes an insulating substrate 20, the first light shield LS1, the second light shield LS2, a color filter layer CF, an overcoat layer OC, an alignment film AL2 and the like. The first light shield LS1 and the second light shield LS2 are disposed between the insulating substrate 20 and the overcoat layer OC. The color filter CF is disposed between the overcoat layer OC and the alignment film AL2. The color filter layer CF includes, for example, a red color filter CFR, a green color filter CFG and a blue color filter CFB. The color filter layer CF is disposed not only in the first display portion AD1 but also in the second display portion DA2, and is a part of the color filter layer CF overlaps the second light shield LS2. A second spacer SP2 is disposed on the overcoat layer OC and is in contact with the first spacer SP1.

Each of the insulating substrates 10 and 20 is a transparent substrate such as a glass substrate or a resin substrate. Each of the insulating films 11 and 13 is a transparent inorganic insulating film. Each of the insulating film 12 and the overcoat layer OC is a transparent organic insulating film. Each of the bus line B1, the feed line F, the signal line S, the drain electrode DE and the metal line ML is formed of a non-transparent metal material. Each of the common electrode CE1, the conductive film TF1 and the pixel electrode PE1 is a transparent electrode formed of a transparent conductive material. Each of the first spacer SP1 and the second spacer SP2 is formed of, for example, a transparent organic insulating material.

A first optical element OD1 including a first polarizer PL1 is bonded to the insulating substrate 10, and a second optical element OD2 including a second polarizer PL2 is bonded to the insulating substrate 20. The first optical element OD1 and the second optical element OD2 may include retarders, etc., as needed. The first polarizer PL1 and the second polarizer PL2 are disposed such that a first polarization axis AX1 of the first polarizer PL1 and a second polarization axis AX2 of the second polarizer PL2 have the relationship of crossed Nicols.

The first sealant SE1 is disposed directly below the first light shield LS1 and is in contact with the alignment films AL1 and AL2. The first sealant SE1 includes the in-sealant spacer SS. The outer surface O1 is located directly above the first end E1 of the first substrate SUB1 or the insulating substrate 10 and is located directly below the second end E2 of the second substrate SUB2 or the insulating substrate 20. In the configuration example shown in FIG. 17, a partition wall PW is disposed inside the first sealant SE1. As described with reference to FIGS. 11, 12A and 12B, the sealant SE and the additional sealant AS are integrated with each other in the process of manufacturing. For example, an inner portion between the partition wall PW and the inner surface I1 of the first sealant SE1 corresponds to a portion formed as the sealant SE, and an outer portion between the partition wall PW and the outer surface O1 of the first sealant SE1 corresponds to a portion formed as the additional sealant AS. When the sealant SE and the additional sealant AS are formed of the same material containing the in-sealant spacer SS, the in-sealant spacers SS are disposed respectively in the inner portion and the outer portion with the partition wall PW in between.

The partition wall PW includes a projection P1 disposed in the first substrate SUB1 and a projection P2 disposed in the second display portion SUB2. The projection P1 is disposed on the insulating film 12 and projects toward the second substrate SUB2. The projection P2 is opposed to the projection P1, is disposed on the overcoat layer OC, and projects toward the first substrate SUB1. In the configuration example shown in FIG. 17, the projection P2 is located directly above the projection P1 along the third direction Z and is separated from the projection P1. Note that the projection P2 may be in contact with the projection P1.

The projection P1 is formed of the same material as the first spacer SP1, and the projection P2 is formed of the same material as the second spacer SP2. At least a part of the projection P1 is covered with the alignment film AL1, and at least a part of the projection P2 is covered with the alignment film AL2. Although the alignment film AL1 is interposed between the projection P1 and the first sealant SE1, the projection P1 may be in contact with the first sealant SE1. Although the alignment film AL2 is interposed between the projection P2 and the first sealant SE1, the projection P2 may be in contact with the first sealant SE1.

Next, other configuration examples will be described. In the above configuration example, the region AB shown in FIG. 10B is filled with the additional sealant AS. On the other hand, in the following configuration examples, a structure different from the sealant SE is disposed in the region AB and the volume of the region AB is thereby reduced. In the cross-sectional views showing the configuration examples, only main parts are illustrated and the alignment films AL and AL2 and the like are not illustrated. In addition, in the cross-sectional views, a cross-section of a region including the cut line CL is shown in (A) and a cross-section of the display panel PNL which is cut out along the cut line CL of (A) is shown in (B).

FIGS. 18A and 18B are cross-sectional views showing another configuration example. As shown in FIG. 18A, a first projection P11 and a second projection P12 which overlap the cut line CL are disposed in the region AB between the adjacent first sealants SE1. The first projection P11 and the second projection P12 are formed in the shape of a line along the cut line CL. The first projection P11 is disposed on the insulating film 12, and the second projection P12 is disposed on the overcoat layer OC. The first projection P11 is formed of the same material as the first spacer SP1, and the second projection P12 is formed of the same material as the second spacer SP2. In the configuration example shown in FIG. 18A, the second projection P12 is separated from the first projection P11. However, from the perspective of the volume reduction of the region AB, it is preferable that the second projection P12 should be in contact with the first projection P11.

Note that the insulating film 12 in the region AB may be omitted. In this case, the first projection P11 is disposed on the insulating film 11. Alternatively, the insulating film 12 and the first projection P11 may be omitted in the region AB. However, from the perspective of the volume reduction of the region AB, it is preferable that the insulating film 12 and the first projection P11 should be disposed or another structure should be disposed in place of them.

As shown in FIG. 18B, the first projection P11 and the second projection P12 form an out-of-sealant structure OW along the outer surface O1 of the first sealant SE1. The out-of-sealant structure OW has an outermost surface O11 of the first projection P11 and an outermost surface O12 of the second projection P12. The outermost surfaces O11 and O12 overlap the first end E1 and the second end E2.

Also in this configuration example, substantially the same effect as that of the above-described configuration example can be achieved.

Figure 19A:
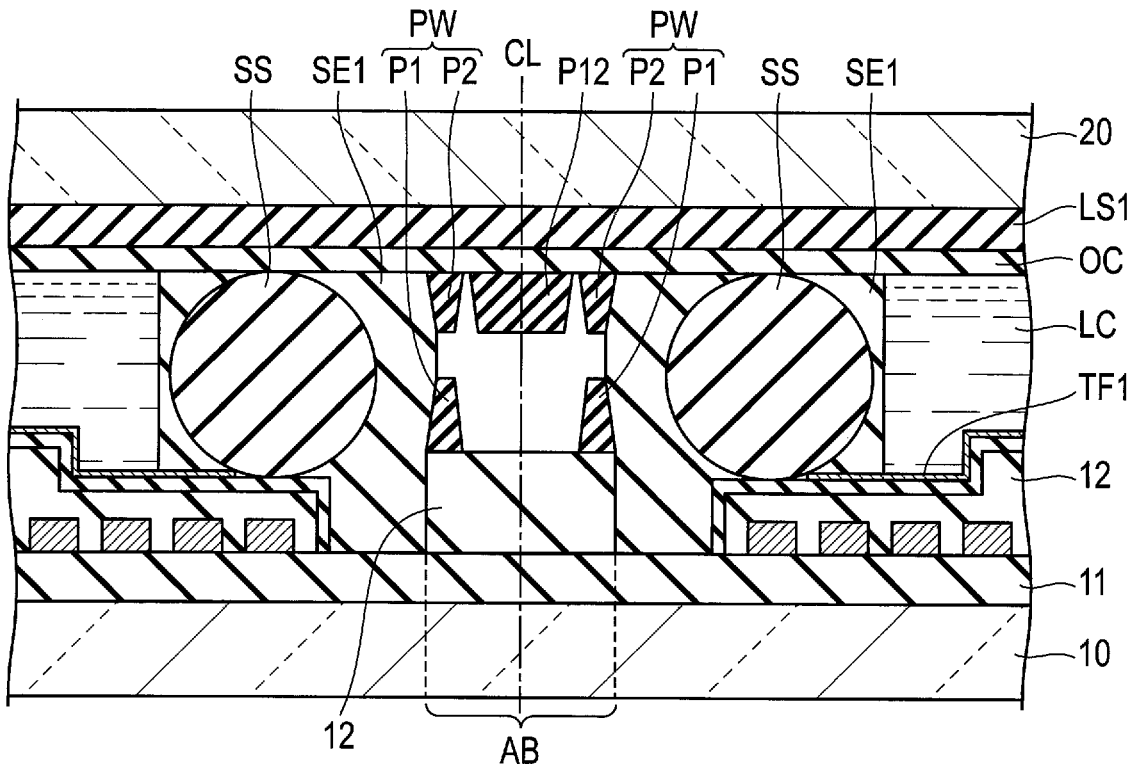
FIG. 19A is a cross-sectional view showing another configuration example.
Figure 19B:
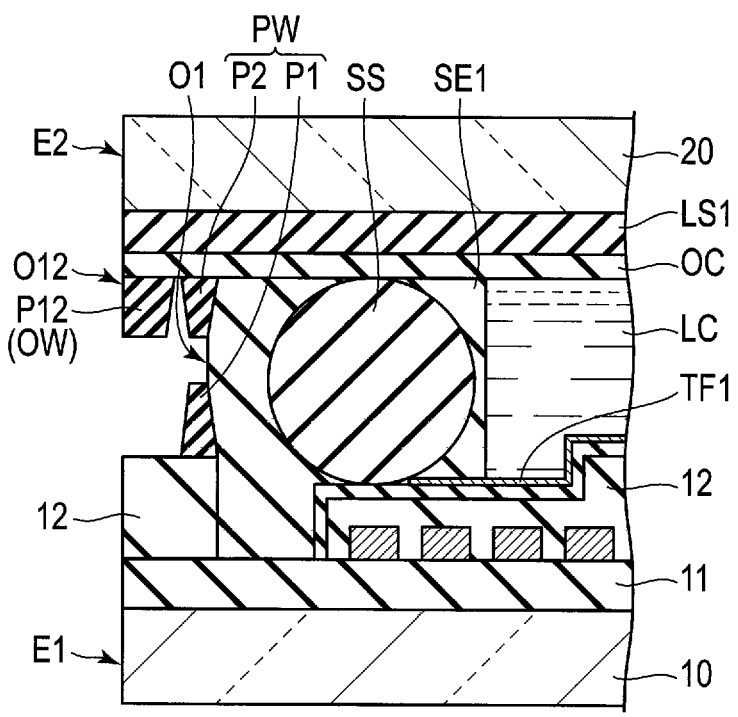
FIG. 19B is a cross-sectional view showing another configuration example of the display panel PNL.

FIGS. 19A and 19B are cross-sectional views showing another configuration example. The configuration example shown in FIG. 19A differs from the configuration example shown in FIG. 18A in that the first projection P11 is omitted and the out-of-sealant structure OW is formed of the second projection P12. Note that the second projection P12 may be omitted and the out-of-sealant structure OW may be formed of the first projection P11 instead. That is, the out-of-sealant structure OW is formed of at least one of the first projection P11 and the second projection P12.

In addition, in the configuration example shown in FIGS. 19A and 19B, the partition wall PW formed of the projection P1 and the projection P2 is disposed between the out-of-sealant structure OW and the first sealant SE1. The projection P2 and the second projection P12 can be formed of the same material.

Also in this configuration example, substantially the same effect as that of the above-described configuration example can be achieved.

FIGS. 20A and 20B are cross-sectional views showing another configuration example. The configuration example shown in FIG. 20A differs from the configuration example shown in FIG. 19A in that the out-of-sealant structure OW includes a black layer 31 overlapping the second projection P12. The black layer 31 is disposed between the first light shield LS1 and the overcoat layer OC.

For example, the first light shield LS1 is formed with the linear light shield extending in the first direction X in the first display portion DA1, and the black layer 31 is formed with the linear light shield extending in the second direction Y in the first display portion DA1. The black layer 31 is formed of the same material as the first light shield LS1. The first light shield LS1 and the black layer 31 are formed of, for example, a black organic insulating material. The overcoat layer OC covers the first light shield LS1 and the black layer 31. The overcoat layer OC is interposed between the second projection P12 and the black layer 31.

Also in this configuration example, substantially the same effect as that of the above-described configuration example can be achieved.

FIGS. 21A and 21B are cross-sectional views showing another configuration example. The configuration example shown in FIG. 21A differs from the configuration example shown in FIG. 19A in that the out-of-sealant structure OW includes a colored layer 32 overlapping the second projection P12. The colored layer 32 is disposed between the first light shield LS1 and the overcoat layer OC.

The colored layer 32 is formed of, for example, the same material as any one of the red color filter CFR, the green color filter CFG and the blue color filter CFB shown in FIG. 17. Note that the colored layer 32 may be a laminate of two or more color filters. The overcoat layer OC covers the first light shield LS1 and the colored layer 32. The overcoat layer OC is interposed between the second projection P12 and the colored layer 32.

Also in this configuration example, substantially the same effect as that of the above-described configuration example can be achieved.

FIGS. 22A and 22B are cross-sectional views showing another configuration example. The configuration example shown in FIG. 22A differs from the configuration example shown in FIG. 19A in that the out-of-sealant structure OW includes the black layer 31 and the colored layer 32 which overlap the second projection P12. The black layer 31 is disposed between the first light shield LS1 and the colored layer 32. The overcoat layer OC covers the first light shield LS1, the black layer 31 and the colored layer 32. The overcoat layer OC is interposed between the second projection P12 and the colored layer 32.

Also in this configuration example, substantially the same effect as that of the above-described configuration example can be achieved.

Figure 23A:
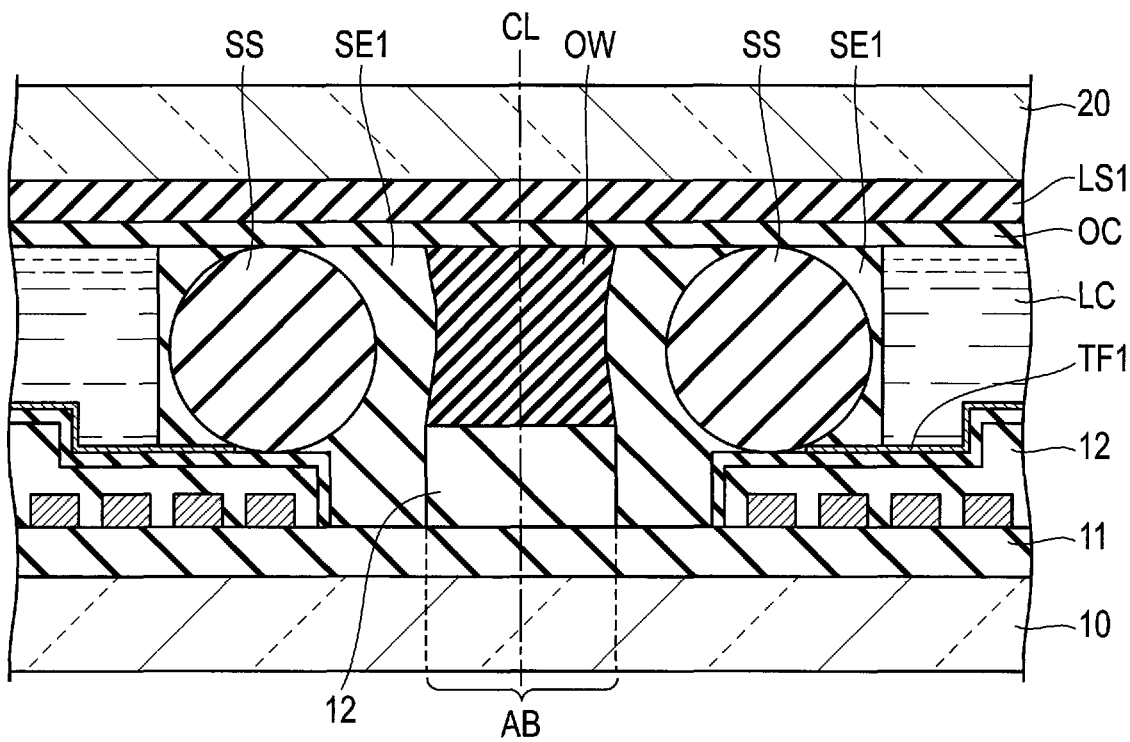
FIG. 23A is a cross-sectional view showing another configuration example.
Figure 23B:
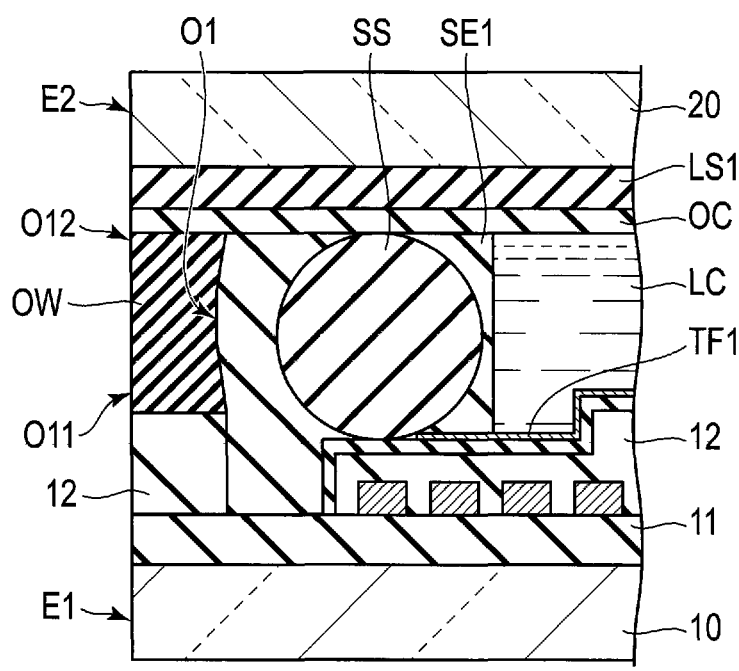
FIG. 23B is a cross-sectional view showing another configuration example of the display panel PNL.

FIGS. 23A and 23B are cross-sectional views showing another configuration example. The configuration example shown in FIG. 23A differs from the above-described configuration examples in that the region AB is filled with the out-of-sealant structure OW. The out-of-sealant structure OW overlaps the cut line CL. This out-of-sealant structure OW may be formed of the first projection P11, may be formed of the second projection P12, or may be formed of the first projection P11 and the second projection P12. This out-of-sealant structure OW is formed in the shape of a line along the cut line CL.

As shown in FIG. 23B, the out-of-sealant structure OW fills from the periphery of the first sealant SE1 to the first end E1 and the second end E2. That is, the out-of-sealant structure OW is disposed along the outer surface O1 of the first sealant SE1, and an outermost surface OW1 of the out-of-sealant structure OW overlaps the first end E1 and the second end E2.

Also in this configuration example, substantially the same effect as that of the above-described configuration example can be achieved.

As described above, according to the present embodiment, a display device which can suppress degradation in reliability can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device comprising:
a first substrate;
a second substrate;
a first sealant surrounding a first chamber and a second chamber between the first substrate and the second substrate;
a second sealant disposed between the first chamber and the second chamber; and
a liquid crystal layer with which the first chamber and the second chamber are filled, wherein
the first chamber comprises a first display portion comprising a first pixel,
the second chamber comprises a second display portion comprising a second pixel, and
the first sealant comprises a first wall having a predetermined width and a second wall having a width less than the width of the first wall,
the first sealant has a pair of first portions extending in a first direction and a pair of second portions extending in a second direction crossing the first direction,
the first display portion and the second display portion are arranged in the second direction,
the first portions are formed as the first wall and face each other via the second sealant,
the second sealant has at least one opening through which the first chamber and the second chamber communicate with each other, and
the first portions are formed as the first wall and face each other via the opening of the second sealant.

2. The display device of claim 1, wherein the second portions are formed as the second wall.

3. The display device of claim 1, wherein a part of the second portion is formed as the first wall and another part of the second portion is formed as the second wall.

4. The display device of claim 1, wherein an outermost surface of the first wall overlaps a first end of the first substrate and a second end of the second substrate.

5. The display device of claim 1, wherein a plurality of the first walls are arranged so as to be symmetrical with respect to a center line of the second sealant.

6. A display device comprising:
a first substrate;
a second substrate;
a first sealant surrounding a first chamber and a second chamber between the first substrate and the second substrate;
a second sealant disposed between the first chamber and the second chamber;
a liquid crystal layer with which the first chamber and the second chamber are filled; and
an out-of-sealant structure formed outside the first sealant when viewed from the liquid crystal layer, wherein
the first chamber comprises a first display portion comprising a first pixel,
the second chamber comprises a second display portion comprising a second pixel,
at least a part of the out-of-sealant structure is formed along a periphery of the first sealant and in direct contact with the first sealant, and
the second sealant has at least one opening through which the first chamber and the second chamber communicate with each other.

7. The display device of claim 6, wherein an outermost surface of the out-of-sealant structure overlaps a first end of the first substrate and a second end of the second substrate.

8. The display device of claim 6, wherein the out-of-sealant structure comprises at least one of a first projection disposed in the first substrate and projecting toward the second substrate and a second projection disposed in the second substrate and projecting toward the first substrate.

9. The display device of claim 8, wherein the out-of-sealant structure further comprises a black layer overlapping the second projection.

10. The display device of claim 8, wherein the out-of-sealant structure further comprises a colored layer overlapping the second projection.

11. The display device of claim 6, wherein the out-of-sealant structure is formed of at least one of a black layer and a colored layer.

12. The display device of claim 6, wherein the out-of-sealant structure fills from a periphery of the first sealant to a first end of the first substrate and a second end of the second substrate.

* * * * *